US011589220B2

(12) United States Patent
Xu et al.

(10) Patent No.: US 11,589,220 B2
(45) Date of Patent: Feb. 21, 2023

(54) COMMUNICATIONS METHOD AND APPARATUS FOR SECURE COMMUNICATION WHEN A TERMINAL IS IN A RADIO RESOURCE CONTROL INACTIVE STATE

(71) Applicant: Huawei Technologies Co., Ltd., Shenzhen (CN)

(72) Inventors: Xiaoying Xu, Shanghai (CN); Hao Bi, Rolling Meadows, IL (US); Li Hu, Shanghai (CN); Qinghai Zeng, Shanghai (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 425 days.

(21) Appl. No.: 16/712,712

(22) Filed: Dec. 12, 2019

(65) Prior Publication Data
US 2020/0120492 A1    Apr. 16, 2020

Related U.S. Application Data

(63) Continuation of application No. PCT/CN2017/088841, filed on Jun. 16, 2017.

(51) Int. Cl.
*H04L 29/06* (2006.01)
*H04W 12/037* (2021.01)
(Continued)

(52) U.S. Cl.
CPC ......... *H04W 12/037* (2021.01); *H04L 9/0861* (2013.01); *H04W 12/06* (2013.01);
(Continued)

(58) Field of Classification Search
CPC ...... H04W 76/30; H04W 12/06; H04L 9/0869
See application file for complete search history.

(56) References Cited

U.S. PATENT DOCUMENTS

2009/0028084 A1    1/2009 Ping
2009/0220087 A1    9/2009 Brusilovsky et al.
(Continued)

FOREIGN PATENT DOCUMENTS

CN    102625300 A    8/2012
CN    102858026 A    1/2013
(Continued)

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 14), 3GPP TS 36.331 V14.2.2 (Apr. 2017), 721 pages.
(Continued)

*Primary Examiner* — Wasika Nipa
(74) *Attorney, Agent, or Firm* — Slater Matsil, LLP

(57) ABSTRACT

An embodiment of this application provides a communications method. The method includes: generating, by an first base station, a radio resource control release message on which encryption and integrity protection are performed by using a new key; and sending, by the first base station, the radio resource control release message to a second base station, thereby improving security of communication between the serving device and the terminal and reducing signaling overheads for performing key negotiation over an air interface.

10 Claims, 21 Drawing Sheets

(51) Int. Cl.
  *H04W 76/30* (2018.01)
  *H04W 76/27* (2018.01)
  *H04L 9/08* (2006.01)
  *H04W 12/06* (2021.01)
  *H04W 28/02* (2009.01)
  *H04W 12/69* (2021.01)

(52) U.S. Cl.
  CPC ....... *H04W 12/69* (2021.01); *H04W 28/0205* (2013.01); *H04W 76/27* (2018.02); *H04W 76/30* (2018.02)

(56) References Cited

U.S. PATENT DOCUMENTS

| | | | |
|---|---|---|---|
| 2013/0310006 A1* | 11/2013 | Chen | H04L 63/061 455/411 |
| 2013/0343280 A1 | 12/2013 | Lee et al. | |
| 2015/0092942 A1 | 4/2015 | Wager et al. | |
| 2015/0341786 A1 | 11/2015 | Wang et al. | |
| 2016/0088525 A1 | 3/2016 | Jeong et al. | |

FOREIGN PATENT DOCUMENTS

| | | |
|---|---|---|
| CN | 103517271 A | 1/2014 |
| CN | 104956644 A | 9/2015 |
| CN | 105828436 A | 8/2016 |
| CN | 105916218 A | 8/2016 |
| JP | 2009253985 A | 10/2009 |
| JP | 2016509804 A | 3/2016 |
| JP | 2016512660 A | 4/2016 |
| KR | 20100114927 A | 10/2010 |
| WO | 2014182911 A1 | 11/2014 |
| WO | 2016123809 A1 | 8/2016 |
| WO | 2017088143 A1 | 6/2017 |

OTHER PUBLICATIONS

3rd Generation Partnership Project;Technical Specification Group Services and System Aspects; 3GPP System Architecture Evolution (SAE); Security architecture (Release 15), 3GPP TS 33. 401, V15.0.0 (Jun. 2017), 153 pages.

Ericsson, "Inactive to Connected state transitions," 3GPP TSG-RAN WG #98, Tdoc R2-1704116, Hangzhou, China, May 15-19, 2017, 6 pages.

ZTE, "Discussion on security method of UE transmitting data in RRC_INACTIVE," 3GPP TSG SA WG3 (Security) Meeting #86, S3-170075, Feb. 6-10, 2017, Sophia Antipolis, France, 5 pages.

Nokia, "Discussion on LS R2-1700656 on Small data transmission," 3GPP TSG SA WG3 (Security) Meeting #86, S3-170113, Feb. 6-10, 2017, Sophia Antipolis, France, 3 pages.

3rd Generation Partnership Project; Technical Specification Group Services and System Aspects; Security Architecture and Procedures for 5G System (Release 15) 3GPP TS 33.501 V0.0.0 (Mar. 2017), 9 pages.

3rd Generation Partnership Project; Technical Specification Group Radio Access Network; NR; NR and NG-RAN Overall Description; Stage 2 (Release 15), 3GPP TS 38.300 V0.2.1 (May 2017), 48 pages.

\* cited by examiner

COMMUNICATIONS METHOD AND APPARATUS FOR SECURE COMMUNICATION WHEN A TERMINAL IS IN A RADIO RESOURCE CONTROL INACTIVE STATE

CROSS-REFERENCE TO RELATED APPLICATIONS

This application is a continuation of International Application No. PCT/CN2017/088841, filed on Jun. 16, 2017, which is hereby incorporated by reference in its entirety.

TECHNICAL FIELD

This application relates to communications technologies, and in particular, to a communications method and apparatus.

BACKGROUND

In the mobile communication field, statuses of a terminal may include a connected state and an idle state. The connected state may be represented by RRC_CONNECTED, and the idle state may be represented by RRC_IDLE. To improve mobility management of the terminal, a third status of the terminal is proposed and is referred to as a third state. The third state may also be referred to as an inactive state. The third state or the inactive state may be represented by RRC_INACTIVE or INACTIVE.

When the terminal is switched from a connected state to a third state, an air interface connection between the terminal and a base station is released, a context of the terminal is still reserved on the base station, and a connection between the base station and a core network that is established for the terminal is still maintained. The base station may be referred to as an anchor base station of the terminal. In terms of mobility, the terminal in the third state may perform cell reselection. When the terminal in the third state needs to send data, the terminal may send a request to a base station. After receiving the request, the base station may provide an air interface resource for the terminal. The base station that provides the air interface resource for the terminal may be referred to as a serving base station. The serving base station and the anchor base station may be different base stations. For related description of the third state, refer to, for example, related content in section 7.2 of third generation partnership project (3GPP) technical specification (TS) 38.300 v0.1.3.

In an initial stage of communication between the terminal in the third state and the serving base station, how to ensure of security of an air interface and reduce air interface signaling overheads is a problem that needs to be resolved.

SUMMARY

Embodiments of this application provide a communications method and apparatus, to ensure security of an air interface between a terminal in a third state and a serving base station and reduce air interface signaling overheads.

According to a first aspect, an embodiment of this application provides a communications method, including: receiving, by a serving device, a first terminal identifier from a terminal, where the first terminal identifier is used to identify the terminal and an anchor device; sending, by the serving device, the first terminal identifier and a wireless configuration parameter to the anchor device; receiving, by the serving device from the anchor device, the wireless configuration parameter encrypted by using a first key, where the first key is a key used by the terminal to communicate with the anchor device; and sending, by the serving device to the terminal, the wireless configuration parameter encrypted by using the first key.

In the method, the wireless configuration parameter allocated by the serving device to the terminal is encrypted by using the key that is used by the terminal to communicate with the anchor device. In this way, the terminal does not need to negotiate a new key with the serving device and then the serving device does not need to use the new key to encrypt the wireless configuration parameter for transmission, thereby reducing air interface signaling overheads for negotiating the new key in a communication procedure and ensuring that the wireless configuration parameter is encrypted during air interface transmission. Therefore, security is ensured.

That the first terminal identifier is used to identify the anchor device may be understood as that the first terminal identifier is associated with the anchor device.

In an optional design, the sending, by the serving device to the terminal, the wireless configuration parameter encrypted by using the first key includes: sending, by the serving device to the terminal, a first message encrypted by using the first key, where the first message includes the wireless configuration parameter; and the receiving, by the serving device from the anchor device, the wireless configuration parameter encrypted by using a first key includes: receiving, by the serving device from the anchor device, the first message encrypted by using the first key. In this design, the wireless configuration parameter is encrypted by using a message encryption mechanism and can be compatible with an old encryption mechanism. Therefore, this solution is simple and highly efficient.

In an optional design, the method further includes: receiving, by the serving device, a key derivation parameter and a second key from the anchor device, where the key derivation parameter is used to derive the second key, the second key is a key used by the terminal to communicate with the serving device, and the first message further includes the key derivation parameter.

In an optional design, the method further includes: receiving, by the serving device from the anchor device, a security algorithm associated with the second key, where the first message further includes the security algorithm, and the security algorithm is at least one of the following: an encryption algorithm associated with the second key and an integrity protection algorithm associated with the second key. In this design, negotiation of the security algorithm can be efficiently implemented, thereby saving signaling.

In an optional design, the method further includes: sending, by the serving device to the anchor device, a security algorithm supported by the serving device, where the security algorithm supported by the serving device includes the security algorithm associated with the second key.

In an optional design, the receiving, by the serving device from the anchor device, the first message encrypted by using the first key is: receiving, by the serving device from the anchor device, the first message on which encryption and integrity protection are performed by using the first key. In this design, integrity protection is added to further ensure security of air interface transmission.

In an optional design, the first message is used to indicate to maintain a third state.

In an optional design, the receiving, by a serving device, a first terminal identifier from a terminal includes: receiving, by the serving device, a second message from the terminal, where the second message includes the first terminal identifier and identity authentication information of the terminal, and the identity authentication information is generated based on the first key; and the sending, by the serving device, a wireless configuration parameter and the first terminal identifier to the anchor device includes: sending, by the serving device, the wireless configuration parameter, the first terminal identifier, and the identity authentication information to the anchor device. In this design, the integrity protection is added to further ensure the security of an air interface.

In an optional design, the method further includes: receiving, by the serving device, a context of the terminal from the anchor device. In this design, the serving device can obtain the context of the terminal, to subsequently serve the terminal.

According to a second aspect, an embodiment of this application provides a communications method, including: receiving, by an anchor device, a first terminal identifier and a wireless configuration parameter from a serving device, where the first terminal identifier is used to identify a terminal and the anchor device; and sending, by the anchor device to the serving device, the wireless configuration parameter encrypted by using a first key, where the first key is a key used by the terminal to communicate with the anchor device.

In the method, the wireless configuration parameter allocated by the serving device to the terminal is encrypted by using the key that is used by the terminal to communicate with the anchor device. In this way, the terminal does not need to negotiate a new key with the serving device and then the serving device does not need to use the new key to encrypt the wireless configuration parameter for transmission, thereby reducing air interface signaling overheads for negotiating the new key in a communication procedure and ensuring that the wireless configuration parameter is encrypted during air interface transmission. Therefore, security is ensured.

In an optional design, the sending, by the anchor device to the serving device, the wireless configuration parameter encrypted by using a first key includes: sending, by the anchor device to the serving device, a first message encrypted by using the first key, where the first message includes the wireless configuration parameter.

In an optional design, the method further includes: sending, by the anchor device, a key derivation parameter and a second key to the serving device, where the key derivation parameter is used to derive the second key, the second key is a key used by the terminal to communicate with the serving device, and the first message further includes the key derivation parameter.

In an optional design, the method further includes: sending, by the anchor device to the serving device, a security algorithm associated with the second key, where the first message further includes the security algorithm, and the security algorithm associated with the second key is at least one of the following: an encryption algorithm associated with the second key and an integrity protection algorithm associated with the second key.

In an optional design, the method further includes: receiving, by the anchor device from the serving device, a security algorithm supported by the serving device, where the security algorithm supported by the serving device includes the security algorithm associated with the second key.

In an optional design, the sending, by the anchor device to the serving device, a first message encrypted by using the first key is: sending, by the anchor device to the serving device, the first message on which encryption and integrity protection are performed by using the first key.

In an optional design, the first message is used to indicate to maintain a third state.

In an optional design, the receiving, by an anchor device, a first terminal identifier associated with the anchor device and a wireless configuration parameter from a serving device includes: receiving, by the anchor device, the first terminal identifier, identity authentication information of the terminal, and the wireless configuration parameter from the serving device, where the identity authentication information is generated based on the first key.

In an optional design, the method further includes: authenticating, by the anchor device, the identity authentication information by using the first key.

In an optional design, the method further includes: sending, by the anchor device, a context of the terminal to the serving device.

For technical effects of the various designs of the second aspect, refer to related description of the first aspect.

According to a third aspect, an embodiment of this application provides a communications method, including: sending, by a terminal, a first terminal identifier to a serving device, where the first terminal identifier is used to identify the terminal and the anchor device; and receiving, by the terminal from the serving device, a wireless configuration parameter encrypted by using a first key, where the first key is a key used by the terminal to communicate with the anchor device.

In the method, the wireless configuration parameter allocated by the serving device to the terminal is encrypted by using the key that is used by the terminal to communicate with the anchor device. In this way, the terminal does not need to negotiate a new key with the serving device and then the serving device does not need to use the new key to encrypt the wireless configuration parameter for transmission, thereby saving air interface signaling overheads for negotiating the new key in a communication procedure and ensuring that the wireless configuration parameter is encrypted during air interface transmission. Therefore, security is ensured.

In an optional design, the receiving, by the terminal from the serving device, a wireless configuration parameter encrypted by using a first key includes: receiving, by the terminal from the serving device, a first message encrypted by using the first key, where the first message includes the wireless configuration parameter.

In an optional design, the first message further includes at least one of the following: a key derivation parameter, an encryption algorithm associated with a second key, and an integrity protection algorithm associated with the second key, where the key derivation parameter is used to derive the second key, and the second key is a key used by the terminal to communicate with the serving device.

In an optional design, the receiving, by the terminal from the serving device, a first message encrypted by using the first key is: receiving, by the terminal from the serving device, the first message on which encryption and integrity protection are performed by using the first key.

In an optional design, the first message is used to indicate to maintain a third state.

In an optional design, the method further includes: maintaining, by the terminal, the third state.

In an optional design, the sending, by a terminal, a first terminal identifier to a serving device includes: sending, by the terminal, a second message to the serving device, where the second message includes the first terminal identifier and identity authentication information of the terminal, and the identity authentication information is generated based on the first key.

For technical effects of the various designs of the third aspect, refer to related description of the first aspect.

According to a fourth aspect, an embodiment of this application provides a communications method, including: receiving, by a serving device, a first terminal identifier from a terminal, where the first terminal identifier is used to identify the terminal and an anchor device; sending, by the serving device, the first terminal identifier and a wireless configuration parameter to the anchor device; receiving, by the serving device from the anchor device, the wireless configuration parameter encrypted by using a second key, the second key, and a key derivation parameter, where the second key is a key used by the serving device to communicate with the terminal, and the key derivation parameter is used to derive the second key; and sending, by the serving device to the terminal, the key derivation parameter and the wireless configuration parameter encrypted by using the second key.

In the fourth aspect, the anchor device assists in the key used between the serving device and the terminal, and encrypts the wireless configuration parameter by using the key. This method can ensure secure transmission of the wireless configuration parameter and reduce signaling overheads for key negotiation.

For various designs of the fourth aspect, refer to the various designs of the first aspect to the third aspect.

According to a fifth aspect, an embodiment of this application provides a communications method, including: receiving, by an anchor device, a first terminal identifier and a wireless configuration parameter from a serving device; sending, by the anchor device to the serving device, a second key, a new key derivation parameter, and the wireless configuration parameter encrypted by using the second key, where the second key is a key used by the serving device to communicate with a terminal, and the key derivation parameter is used to derive the second key.

In the fifth aspect, the anchor device assists in the key used between the serving device and the terminal, and encrypts the wireless configuration parameter by using the key. This method can ensure secure transmission of the wireless configuration parameter and reduce signaling overheads for key negotiation.

For various designs of the fifth aspect, refer to the various designs of the first aspect to the third aspect.

According to a sixth aspect, an embodiment of this application provides a communications method, including: sending, by a terminal, a first terminal identifier to a serving device, where the first terminal identifier is used to identify the terminal and an anchor device; and receiving, by the terminal from the serving device, a second key, a key derivation parameter, and a wireless configuration parameter encrypted by using the second key, where the second key is a key used by the serving device to communicate with the terminal, and the key derivation parameter is used to derive the second key.

In the sixth aspect, the anchor device assists in the key used between the serving device and the terminal, and encrypts the wireless configuration parameter by using the key. This method can ensure secure transmission of the wireless configuration parameter and reduce signaling overheads for key negotiation.

For various designs of the sixth aspect, refer to the various designs of the first aspect to the third aspect.

According to a seventh aspect, an embodiment of this application provides a communications method, including: receiving, by a serving device, a first terminal identifier from a terminal, where the first terminal identifier is used to identify the terminal and an anchor device; sending, by the serving device, the first terminal identifier to the anchor device; receiving, by the serving device, a new key derivation parameter and a second key from the anchor device; and sending, by the serving device to the terminal, the new key derivation parameter and a wireless configuration parameter encrypted by using the second key, where the second key is a key used by the serving device to communicate with the terminal, and the key derivation parameter is used to derive the second key.

In the seventh aspect, the anchor device assists in the key used between the serving device and the terminal, and the anchor device encrypts the wireless configuration parameter by using the key. This method can ensure secure transmission of the wireless configuration parameter and reduce signaling overheads for key negotiation.

For various designs of the seventh aspect, refer to the various designs of the first aspect to the third aspect.

According to an eighth aspect, an embodiment of this application provides a communications method, including: receiving, by an anchor device, a first terminal identifier from a serving device, where the first terminal identifier is used to identify a terminal; and sending, by the anchor device, a second key and a key derivation parameter to the serving device, where the second key is a key used by the serving device to communicate with the terminal, and the key derivation parameter is used to derive the second key.

In the eighth aspect, the anchor device assists in the key used between the serving device and the terminal, and the anchor device encrypts a wireless configuration parameter by using the key. This method can ensure secure transmission of the wireless configuration parameter and reduce signaling overheads for key negotiation.

For various designs of the eighth aspect, refer to the various designs of the first aspect to the third aspect.

According to a ninth aspect, an embodiment of this application provides a communications method, and the method includes: receiving, by a serving device, a first terminal identifier from a terminal, where the first terminal identifier is used to identify the terminal and an anchor device; sending, by the serving device, the first terminal identifier to the anchor device; receiving, by the serving device, a first key from the anchor device; and sending, by the serving device to the terminal, a wireless configuration parameter encrypted by using the first key, where the first key is a key used by the anchor device to communicate with the terminal.

In the ninth aspect, the anchor device sends, to the serving device, the first key used by the anchor device to communicate with the terminal device, and the serving device encrypts the wireless configuration parameter by using the first key. In this way, the terminal does not need to negotiate a new key with the serving device and then the serving device does not need to use the new key to encrypt the wireless configuration parameter for transmission, thereby saving air interface signaling overheads for negotiating the new key in a communication procedure and ensuring that the wireless configuration parameter is encrypted during air interface transmission. Therefore, security is ensured.

For various designs of the ninth aspect, refer to the various designs of the first aspect to the third aspect.

According to a tenth aspect, an embodiment of this application provides a communications method, and the method includes: receiving, by an anchor device, a first terminal identifier from a serving device, where the first terminal identifier is used to identify a terminal; and sending, by the anchor device, a first key to the serving device, where the first key is a key used by the anchor device to communicate with the terminal.

In the tenth aspect, the anchor device sends, to the serving device, the first key used by the anchor device to communicate with the terminal device, and the serving device encrypts the wireless configuration parameter by using the first key. In this way, the terminal does not need to negotiate a new key with the serving device and then the serving device does not need to use the new key to encrypt the wireless configuration parameter for transmission, thereby saving air interface signaling overheads for negotiating the new key in a communication procedure and ensuring that the wireless configuration parameter is encrypted during air interface transmission. Therefore, security is ensured.

For various designs of the tenth aspect, refer to the various designs of the first aspect to the third aspect.

According to an eleventh aspect, an embodiment of this application provides a communications apparatus. The communications apparatus may be configured to implement the method in any one of the first aspect, the fourth aspect, the seventh aspect, and the ninth aspect. The communications apparatus may be a base station, a chip, or a baseband processing board.

In an optional design, the communications apparatus includes a processor. The processor is configured to execute functions of various parts in any one of the first aspect, the fourth aspect, the seventh aspect, and the ninth aspect.

In another optional design, the apparatus includes a processor and a memory. The memory is configured to store a program for implementing the method in any one of the first aspect, the fourth aspect, the seventh aspect, and the ninth aspect. The processor is configured to run the program to implement the method in any one of the first aspect, the fourth aspect, the seventh aspect, and the ninth aspect.

In another optional design, the apparatus includes one or more chips, for example, a chip including a processor or a chip including a transceiver circuit. The apparatus may be configured to execute functions of various parts in any one of the first aspect, the fourth aspect, the seventh aspect, and the ninth aspect.

Optionally, the communications apparatus may include a transceiver component.

According to a twelfth aspect, an embodiment of this application provides a communications apparatus. The communications apparatus may be configured to implement the method in any one of the second aspect, the fifth aspect, the eighth aspect, and the tenth aspect. The communications apparatus may be a base station, a chip, or a baseband processing board.

In an optional design, the communications apparatus includes a processor. The processor is configured to execute functions of various parts in any one of the second aspect, the fifth aspect, the eighth aspect, and the tenth aspect.

In another optional design, the apparatus includes a processor and a memory. The memory is configured to store a program for implementing the method in any one of the second aspect, the fifth aspect, the eighth aspect, and the tenth aspect. The processor is configured to run the program to implement the method in any one of the second aspect, the fifth aspect, the eighth aspect, and the tenth aspect.

In another optional design, the apparatus includes one or more chips, for example, a chip including a processor or a chip including a transceiver circuit. The apparatus may be configured to execute functions of various parts in any one of the second aspect, the fifth aspect, the eighth aspect, and the tenth aspect.

Optionally, the communications apparatus may include a transceiver component.

According to a thirteenth aspect, an embodiment of this application provides a communications apparatus. The communications apparatus may be configured to implement the method in either of the third aspect and the sixth aspect. The communications apparatus may be a terminal or a chip.

In an optional design, the communications apparatus includes a processor. The processor is configured to execute functions of various parts in either of the third aspect and the sixth aspect.

In another optional design, the apparatus includes a processor and a memory. The memory is configured to store a program for implementing the method in either of the third aspect and the sixth aspect. The processor is configured to run the program to implement the method in either of the third aspect and the sixth aspect.

In another optional design, the apparatus includes one or more chips, for example, a chip including a processor or a chip including a transceiver circuit. The apparatus may be configured to execute functions of various parts in either of the third aspect and the sixth aspect.

Optionally, the communications apparatus may include a transceiver component.

According to a fourteenth aspect, an embodiment of this application further provides a computer program product, and the program product includes a program for implementing the method in any one of the first aspect to the tenth aspect.

According to a fifteenth aspect, an embodiment of this application further provides a computer-readable storage medium, and the medium stores the program in the fourteenth aspect.

In the technical solutions in this application, with the assistance of the anchor device, the wireless configuration parameter may be encrypted by using the first key or the second key, thereby ensuring transmission security and reducing signaling overheads for key negotiation.

BRIEF DESCRIPTION OF THE DRAWINGS

To describe the technical solutions in this application more clearly, the following briefly describes the accompanying drawings required for describing the embodiments.

DETAILED DESCRIPTION OF ILLUSTRATIVE EMBODIMENTS

The following describes the embodiments of this application with reference to the accompanying drawings in this application.

For ease of understanding, the following describes some conventions in this application.

In this application, an identifier may be an index, a serial number, or the like.

In this application, the term "include" and its variant may be non-exclusive inclusion. The term "or" and its variant may be "and/or". The terms "associated", "being associated", "corresponding to", and their variants may be "bound", "being bound . . . to", "in a mapping relationship", "configured", "allocated", "based on . . . ", "obtained based on . . . ", and the like. The term "through" and its variant may be "make use of", "by using", "on . . . ", and the like. The term "obtain", "determine", and their variants may be "select", "query", "calculate", and the like. The term "when . . . " may be "if", "on the condition that . . . ", or the like.

In this application, for example, content in parenthesis "( )" may be an example, may be another expression manner, may be omitted description, or may be further explanation and description.

The following describes the technical solutions in this application.

Figure 1:
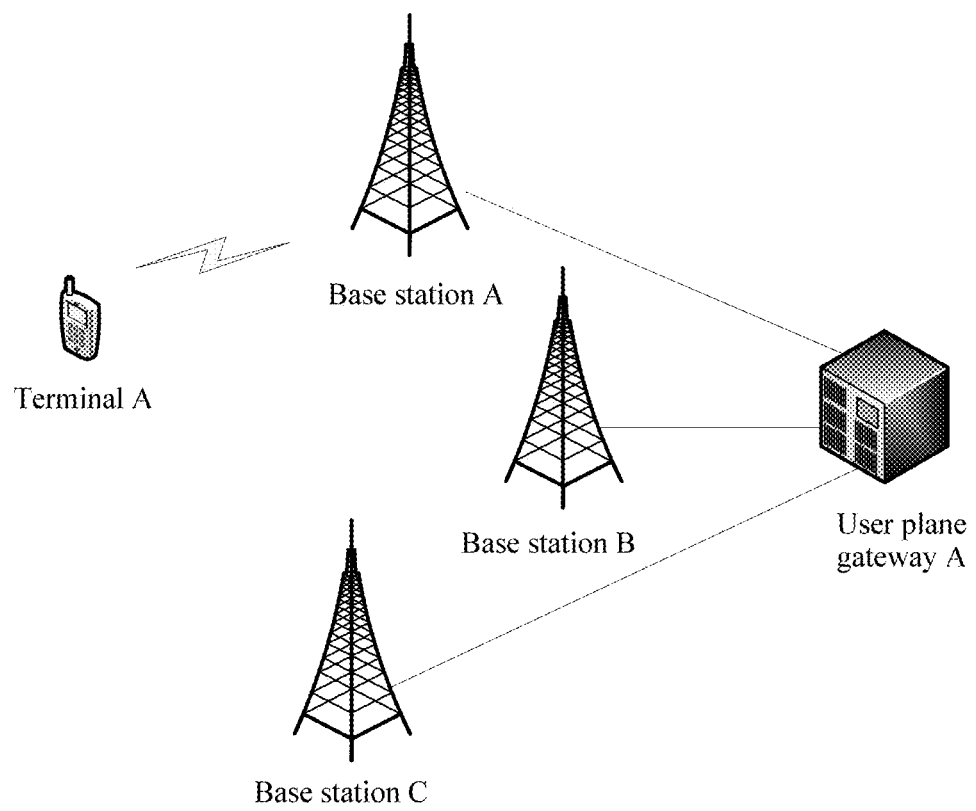
FIG. 1 is a simplified schematic diagram of a wireless communications system.

FIG. 1 is a schematic diagram of a wireless communications system. As shown in FIG. 1, the wireless communications system includes a core network device (for example, a user plane gateway A) and a plurality of access network devices (only a base station A, a base station B, and a base station C are shown in the figure, but more access network devices may be included). The plurality of access network devices are connected to the core network device. The wireless communications system may be a fourth generation (4G) communications system such as a long term evolution (LTE) system, or a fifth generation (5G) communications system such as a new radio (NR) system, or a communications system integrating a plurality of wireless technologies such as a communications system integrating an LTE technology and an NR technology. The access network device may perform wireless communication with a terminal A by using an air interface resource.

In the wireless communications system shown in FIG. 1, the terminal A may establish an air interface connection to the base station A to transmit data. In this case, the terminal A is in a connected state, a connection between the base station A and the user plane gateway A is established for the terminal A, and a context of the terminal A is stored in the base station A and the user plane gateway A. After data transmission is completed, the terminal A may enter a third state. In this case, the air interface connection between the terminal A and the base station A is released, the connection between the base station A and the user plane gateway A that is established for the terminal A is maintained, and the context of the terminal A is still stored in the base station A and the user plane gateway A. In this case, the base station A may be referred to as an anchor base station of the terminal A. When the terminal A moves to a cell of the base station C, the terminal A may send a message to the base station C to request the base station C to serve the terminal A. In this case, the base station C may be referred to as a serving base station of the terminal A. In this application, the anchor base station is a base station that reserves the context of the terminal when the terminal is in the third state, and the serving base station is a base station that serves the terminal by using an air interface resource of the base station.

Figure 2:
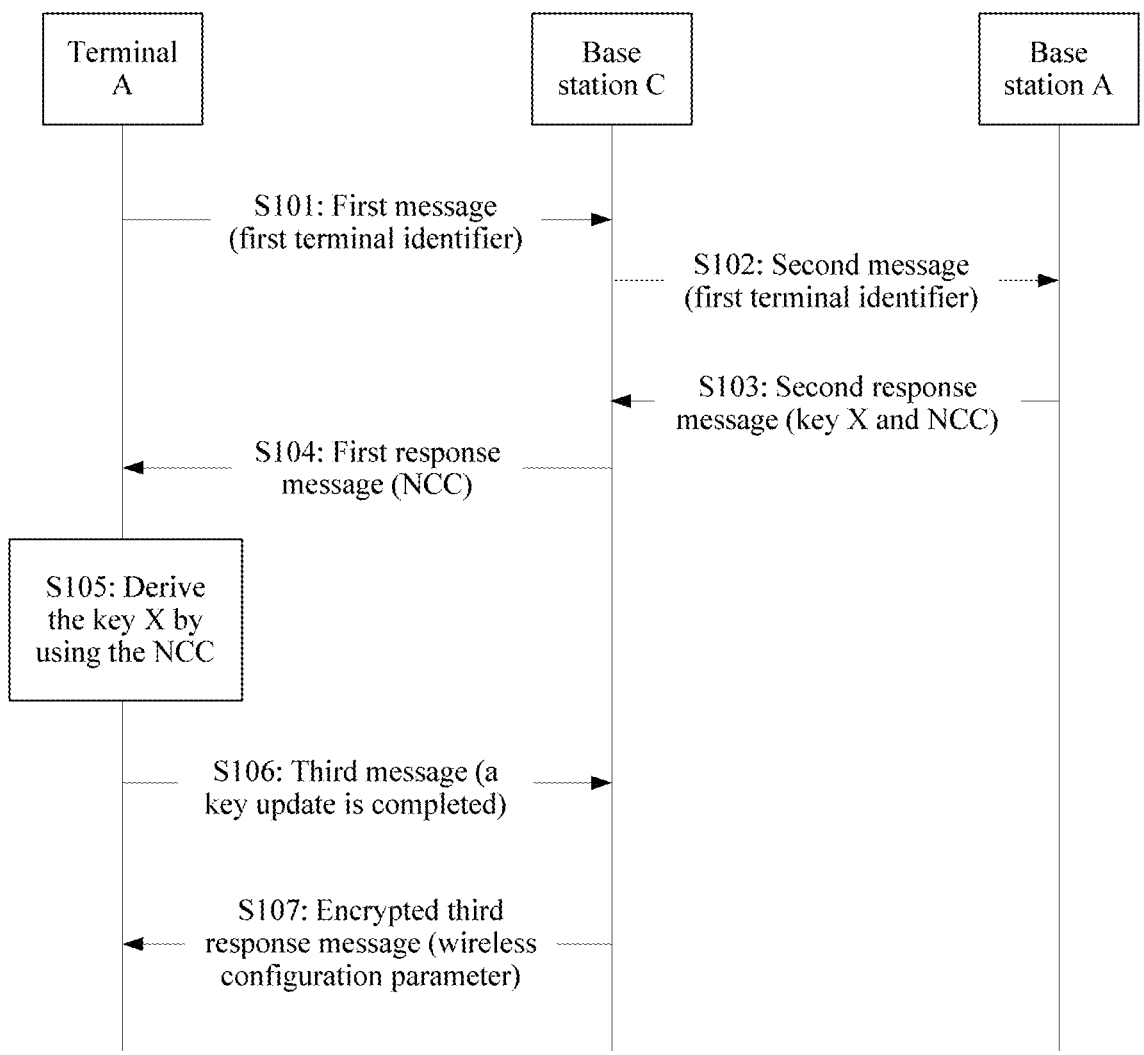
FIG. 2 is a schematic flowchart of communication between a terminal and a serving base station.

FIG. 2 is a schematic flowchart of communication between a terminal and a serving base station. As shown in FIG. 2, a terminal A is in a third state, a base station A is an anchor base station of the terminal A, and the terminal A selects a base station C as a serving base station of the terminal A.

S101: The terminal A sends a first message to the base station C, where the first message includes a first terminal identifier of the terminal A, and the first terminal identifier is associated with the base station A.

S102: The base station C sends a second message to the base station A, where the second message includes the first terminal identifier.

S103: The base station A sends a second response message to the base station C, where the second response message includes a key X and a next hop chaining count (NCC) for deriving the key X, and the key X is a key used by the base station C to communicate with the terminal A.

S104: The base station C sends a first response message to the terminal A, where the first response message includes the NCC, and integrity protection may be performed on the first response message by using the key X.

S105: The terminal A derives the key X by using the NCC.

S106: The terminal A sends a third message to the base station C.

For example, the third message may be used to notify the base station C that a key update is completed. Encryption and integrity protection may be performed on the third message by using the key X.

S107: The base station C sends a third response message to the terminal A, where the third response message includes a wireless configuration parameter allocated to the terminal A, and encryption and integrity protection are performed on the third response message by using the key X.

In the communication process shown in FIG. 2, the serving base station first performs key negotiation with the terminal, and then performs encryption and integrity protection on the wireless configuration parameter by using a key obtained through negotiation. In the foregoing process, although security of the wireless configuration parameter is ensured, air interface signaling overheads are relatively high and a latency is relatively long.

Figure 3:
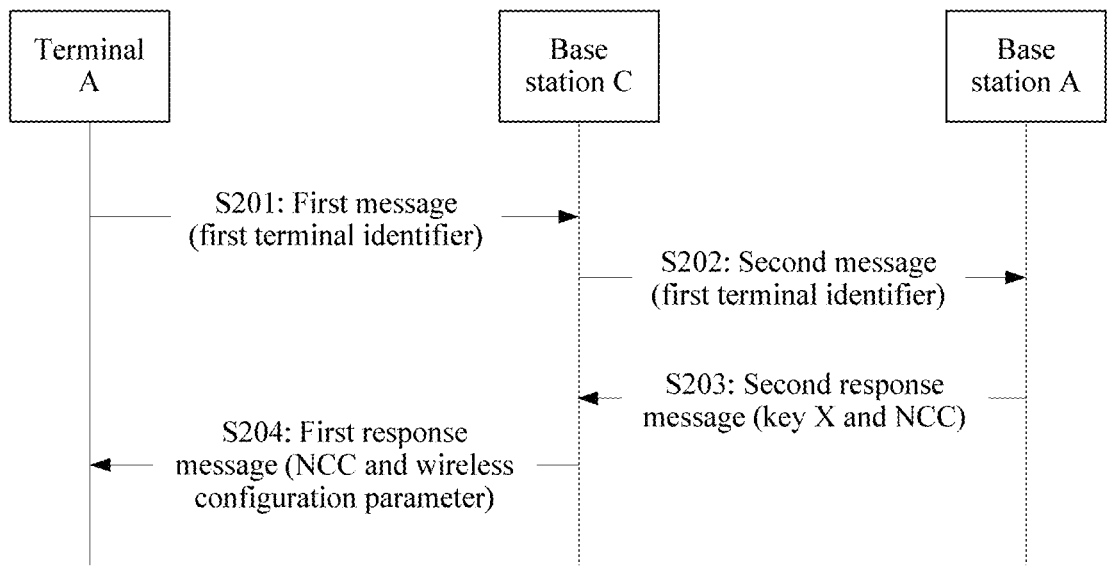
FIG. 3 is another schematic flowchart of communication between a terminal and a serving base station.

FIG. 3 is another schematic flowchart of communication between a terminal and a serving base station. As shown in FIG. 3, a terminal A is in a third state, a base station A is an anchor base station of the terminal A, and the terminal A selects a base station C as a serving base station of the terminal A.

S201: The terminal A sends a first message to the base station C, where the first message includes a first terminal identifier of the terminal A, and the first terminal identifier is associated with the base station A.

S202: The base station C sends a second message to the base station A, where the second message includes the first terminal identifier.

S203: The base station A sends a second response message to the base station C, where the second response message includes a key X and an NCC for deriving the key X, and the key X is a key used by the base station C to communicate with the terminal A.

S204: The base station C sends a first response message to the terminal A, where the first response message includes the NCC and a wireless configuration parameter allocated to the terminal A, and integrity protection is performed on the first response message by using the key X.

In the communication process shown in FIG. 3, in a process of performing key negotiation with the terminal, the serving base station sends, to the terminal, the NCC for deriving the key X and the wireless configuration parameter on which only integrity protection but no encryption is performed. Although air interface signaling overheads for obtaining the wireless configuration parameter by the terminal A in the foregoing process are relatively low, there is a security risk because the wireless configuration parameter is not encrypted.

In view of the foregoing problems in the communication processes shown in FIG. 2 and FIG. 3, this application provides the following two solutions, to ensure security of an air interface and reduce air interface signaling overheads.

For ease of description, a key used by the terminal to communicate with the anchor base station is referred to as an old key, a key derivation parameter used to derive the old key is referred to as an old key derivation parameter, a key used by the terminal to communicate with the serving base station is referred to as a new key, and a key derivation parameter used to derive the new key is referred to as a new key derivation parameter below.

Solution 1: The serving base station sends, to the anchor base station, the wireless configuration parameter to be sent to the terminal, the anchor base station encrypts the wireless configuration parameter by using the old key, and the serving base station sends, to the terminal, the wireless configuration parameter encrypted by using the old key.

In Solution 1, the terminal does not need to negotiate a new key with the serving base station and then the serving base station does not need to use the new key to encrypt the wireless configuration parameter for transmission, thereby reducing air interface signaling overheads for negotiating the new key in a communication procedure and ensuring that the wireless configuration parameter is encrypted during air interface transmission. Therefore, security is ensured.

Solution 2: The anchor base station assists the serving base station and the terminal in completing key negotiation, and the serving base station or the anchor base station encrypts the wireless configuration parameter by using the new key and sends the encrypted wireless configuration parameter to the terminal.

In Solution 2, the anchor base station assists the terminal and the serving base station in key negotiation, thereby saving signaling. In addition, the wireless configuration parameter is transmitted by using the new key, thereby ensuring security.

Solution 1

The following describes implementations of Solution 1. Solution 1 has a plurality of optional implementations.

Figure 4:
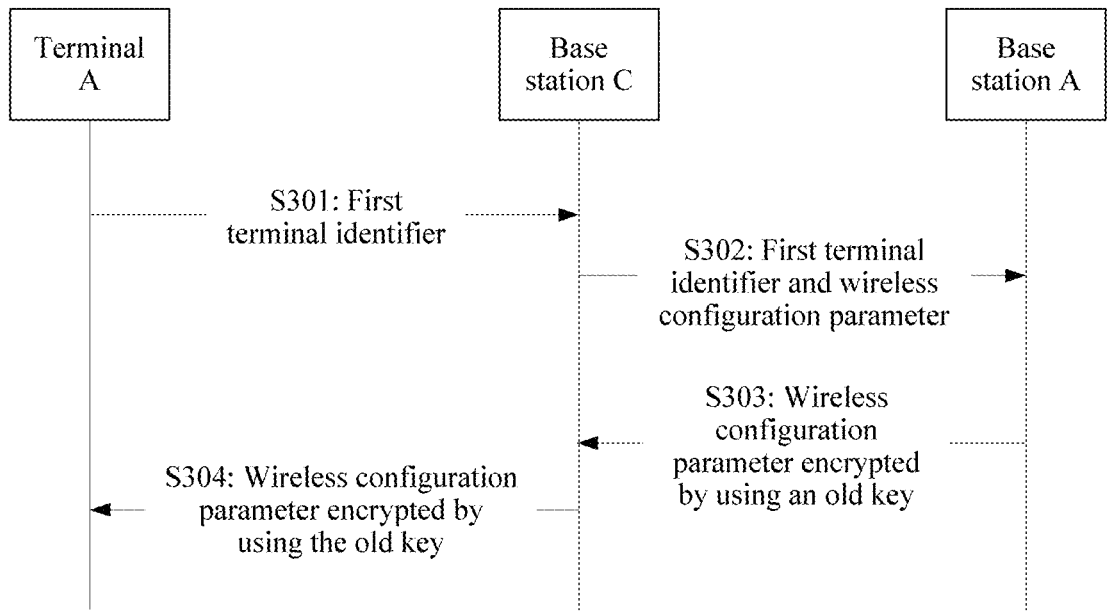
FIG. 4 is still another schematic flowchart of communication between a terminal and a serving base station.

FIG. 4 shows a first implementation of Solution 1. As shown in FIG. 4, a terminal A is in a third state, a base station A is an anchor base station of the terminal A, and the terminal A selects a base station C as a serving base station of the terminal A.

S301: The terminal A sends a first terminal identifier to the base station C, where the first terminal identifier is used to identify the terminal A and the base station A. That the first terminal identifier is used to identify the base station A may be understood as that the first terminal identifier is associated with the base station A.

S302: The base station C sends the first terminal identifier and a wireless configuration parameter to the base station A.

Because the first terminal identifier is associated with the base station A, the base station C may determine the base station A based on the first terminal identifier. The wireless configuration parameter may be a wireless configuration parameter that needs to be sent by the base station C to the terminal A.

Optionally, the base station C may allocate a packet data convergence protocol (PDCP) sequence number (SN) to the wireless configuration parameter, and send the PDCP SN to the base station A.

S303: The base station A sends, to the base station C, the wireless configuration parameter encrypted by using an old key.

After receiving the first terminal identifier, the base station A may learn of the old key used to communicate with the terminal A, and encrypt the wireless configuration parameter by using the old key.

S304: The base station C sends, to the terminal A, the wireless configuration parameter encrypted by using the old key.

After receiving the wireless configuration parameter encrypted by using the old key, the terminal A may decrypt the encrypted wireless configuration parameter by using the old key. The terminal A does not need to first complete negotiation of a new key with the base station C to encrypt the wireless configuration parameter by using the new key, thereby saving air interface signaling overheads. In addition, the wireless configuration parameter transmitted over an air interface is encrypted, thereby ensuring security.

That the first terminal identifier in S301 is associated with the base station A means that the base station A may be determined based on the first terminal identifier. There are a plurality of designs in which the first terminal identifier is associated with the base station A. In a first optional design, a mapping table is stored, where a mapping relationship between the first terminal identifier and the base station A is recorded in the mapping table. The mapping table may be stored in the base station C; or the mapping table is stored in another device, and the base station C obtains the mapping table from the another device. In a second optional design, the first terminal identifier includes at least two parts: an identifier of the base station A and an identifier of the terminal A in the base station A. In the second optional design, a mapping relationship between each terminal identifier and an anchor base station does not need to be maintained on a plurality of base stations or devices, and therefore this implementation is relatively simple.

The wireless configuration parameter in S302 is a configuration parameter that is to be sent by the serving base station to the terminal. Which wireless configuration parameters are specifically sent by the serving base station to the terminal may be determined based on different communication requirements. For example, if the serving base station expects the terminal to enter a connected state, the wireless configuration parameter may include radio resource configuration dedicated information, compression indication information, antenna configuration information, measurement configuration information, and the like. For another example, if the serving base station expects the terminal to enter an idle state, the wireless configuration parameter may include redirection carrier information, priority information of a reselected cell list, a release cause value, and the like. For another example, if the serving base station expects to serve as an anchor base station of the terminal, the wireless configuration parameter may include a second terminal identifier associated with the serving base station, and the second terminal identifier is used to identify the terminal. For a design of the second terminal identifier associated with the serving base station, refer to the design of the first terminal identifier associated with the base station A. As communication requirements change, wireless configuration parameters to be sent by the serving base station to the terminal may also change. This is not limited in this embodiment of this application. In an optional design, the wireless configuration parameter may include at least one of the following: a second terminal identifier associated with the serving base station, radio resource configuration dedicated information, compression indication information, antenna configuration information, redirection carrier information, priority information of a reselected cell list, a release cause value, measurement configuration information, a cell radio network temporary identifier (C-RNTI) allocated by a serving cell, and a radio resource control (RRC) status indication. Optionally, the second terminal identifier associated with the serving base station may be the same as the first terminal identifier.

The old key in S303 is generated through key negotiation by the terminal A and the base station A, and may be used for encryption and integrity protection of communication between the terminal A and the base station A. The old key may be a base station key (for example, KeNB). Performing encryption by using the old key means that an encryption key (for example, KRRCenc) is derived by using the old key, and that encryption is performed by using the derived encryption key. In an example, the old key may be a key used by the terminal A and the base station A when the terminal A is in a connected state. In another example, the old key may be a key derived by the terminal A based on a key derivation parameter carried in a message indicating to enter a third state and an identifier of a serving cell that is of the base station A and in which the terminal A is located.

The old key in S303 may be further used for integrity protection. Performing integrity protection by using the old key means that an integrity protection key (for example, KRRCint) is derived by using the old key, and integrity protection is performed by using the integrity protection key.

The old key in S303 may be further used for identity authentication protection. Performing identity authentication protection by using the old key means that an integrity protection key (for example, KRRCint) is derived by using the old key, and that a message authentication code for integrity (MAC-I) is generated by using the integrity protection key. The MAC-I may sometimes be referred to as a token.

The KRRCenc and the KRRCint belong to control plane keys, and a user plane key such as KUPenc may be derived by using a base station key. In this application, for a method for deriving an encryption key and an integrity protection key by using a base station key, refer to, for example, related content in section 7.3, section 7.4, and Annex A: Key derivation function of 3GPP TS 33.401 v14.2.0. For algorithms for performing encryption by using an encryption key and performing integrity protection by using an integrity protection key, refer to, for example, Annex B: Algorithms for ciphering and integrity protection of 3GPP TS 33.401 v14.2.0.

Figure 5:
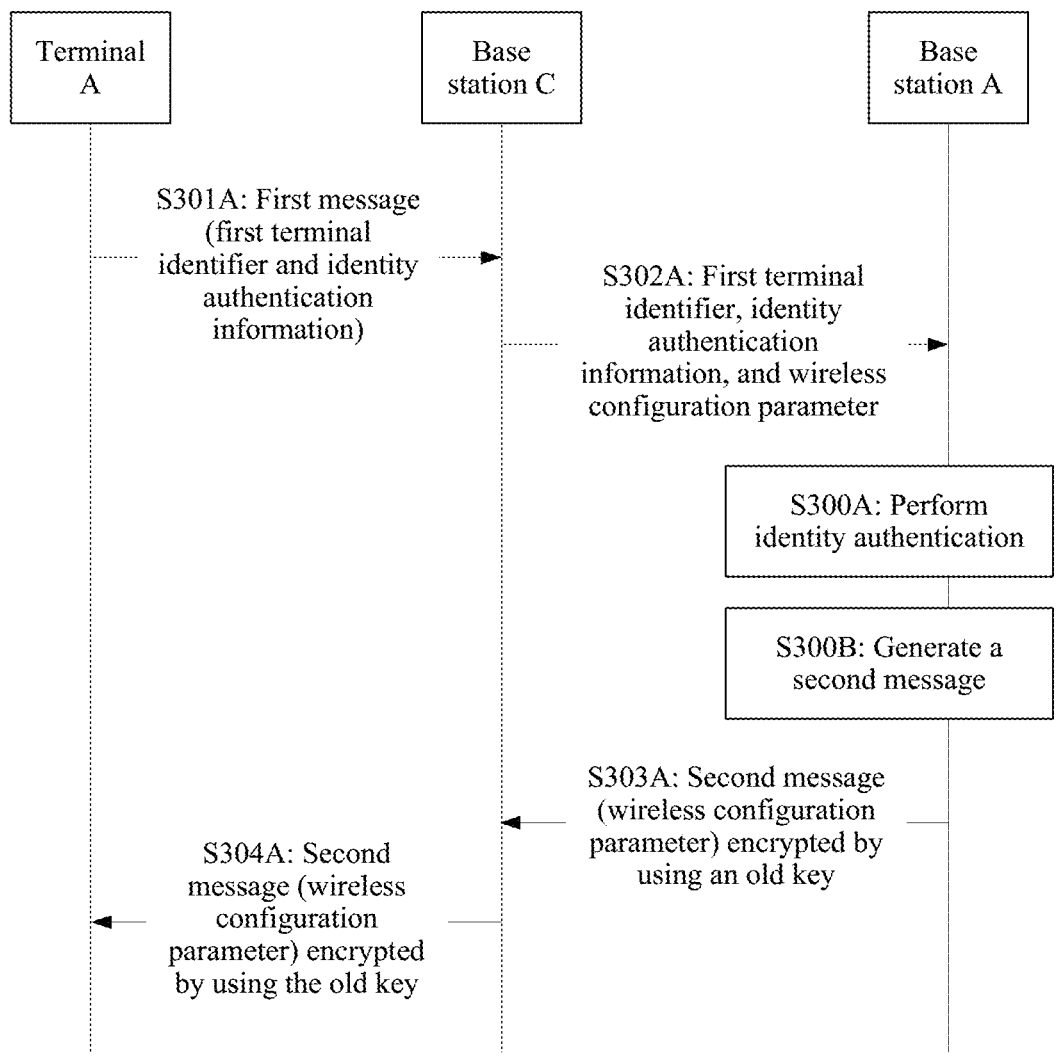
FIG. 5 is still another schematic flowchart of communication between a terminal and a serving base station.

To improve security of an air interface, the old key may be used to add identity authentication protection in S301 and integrity protection in S304 in the first implementation. FIG. 5 shows a second implementation based on the first implementation. As shown in FIG. 5, the second implementation includes the following steps.

S301A: The terminal A sends a first message to the base station C, where the first message includes a first terminal identifier and identity authentication information. The identity authentication information is generated based on an old key, that is, identity authentication protection is performed on the terminal A based on the old key. The identity authentication information may be generated by using an integrity protection algorithm.

S302A: The base station C sends the first terminal identifier, the identity authentication information, and a wireless configuration parameter to the base station A.

Optionally, the base station C may send the first message to the base station A to send the first terminal identifier and the identity authentication information to the base station A. For example, S302A may be: The base station C sends the first message and the wireless configuration parameter to the base station A.

S300A: The base station A performs identity authentication.

The base station A may perform identity authentication on the terminal A based on the old key and the identity authentication information.

If the authentication fails, the base station A may notify the base station C that the authentication fails, and the base station C may indicate the terminal A to establish a connection, for example, establish an RRC connection. If the authentication succeeds, S300B may be performed.

S300B: The base station A generates a second message, where the second message includes the wireless configuration parameter.

S303A: The base station A sends, to the base station C, the second message on which encryption and integrity protection are performed by using the old key.

The base station A may obtain the first terminal identifier from the first message, learn of the old key used to communicate with the terminal A, and perform encryption and integrity protection on the second message by using the old key.

S304A: The base station C sends, to the terminal A, the second message on which encryption and integrity protection are performed by using the old key.

After receiving the second message on which encryption and integrity protection are performed by using the old key, the terminal A may perform decryption and integrity authentication by using the old key. The terminal A does not need to first complete negotiation of a new key with the base station C to transmit the wireless configuration parameter, thereby saving air interface signaling interaction overheads. In addition, encryption and integrity protection are performed on the wireless configuration parameter transmitted over an air interface, thereby improving security.

Whether to perform identity authentication protection on the terminal A may be selected based on an actual network requirement. If the first message does not include the identity authentication information, that is, no identity authentication protection is performed on the terminal A, S300A may not be performed.

Based on the first implementation shown in FIG. 4, integrity protection for interaction between the terminal and the serving base station is added to the second implementation shown in FIG. 5, thereby further ensuring security.

For the first terminal identifier in S301A, refer to related description of S301.

The identity authentication information in S301A is information used to authenticate an identity of the terminal. For example, the identity authentication information may be a message authentication code for integrity (MAC-I). For related description of the MAC-I, refer to, for example, content in section 6.3.3 of 3GPP TS 36.331 v14.2.2. For related content of generating the MAC-I by the terminal, refer to, for example, related content in section 5.3.7.4 of 3GPP TS 36.331 V14.2.2.

Optionally, the first message in S301A may be an RRC message. For example, the first message may be an RRC connection reestablishment request (RRCConnectionReestablishmentRequest) message or an RRC connection resume request (RRCConnectionResumeRequest) message. For related content of the RRC connection reestablishment request message and the RRC connection resume request message, refer to, for example, related content in section 6.2.2 of 3GPP TS 36.331 v14.2.2.

For performing identity authentication protection on the terminal A based on the old key in S301A, refer to related content in the first implementation.

For related content of the wireless configuration parameter in S302A, refer to related description of S302.

Optionally, the second message may be an RRC message. For example, the second message may be an RRC connection reestablishment (RRCConnectionReestablishment) message, an RRC connection reestablishment reject (RRCConnectionReestablishmentReject) message, an RRC connection resume (RRCConnectionResume) message, an RRC connection setup (RRCConnectionSetup) message, an RRC connection reject (RRCConnectionReject) message, or an RRC connection release (RRCConnectionRelease) message. For related content of the RRC connection reestablishment message, the RRC connection reestablishment reject message, the RRC connection resume message, the RRC connection setup message, the RRC connection reject message, and the RRC connection release message, refer to, for example, related content in section 6.2.2 of 3GPP TS 36.331 v14.2.2. In an optional design, the second message may be used to indicate the terminal to maintain a third state, enter a connected state, or enter an idle state.

For description of the old key in the implementation shown in FIG. 5, refer to related content in the implementation shown in FIG. 4.

For identity authentication in S300A, refer to, for example, related content in Annex B.2 of 3GPP TS 33.401 v14.2.0.

For performing encryption and integrity protection on the second message in S303A, refer to, for example, related content in section 5.6 and section 5.7 of 3GPP TS 36.323 v14.2.0 and related content in Annex B of 3GPP TS 33.401 v14.2.0.

Figure 6:
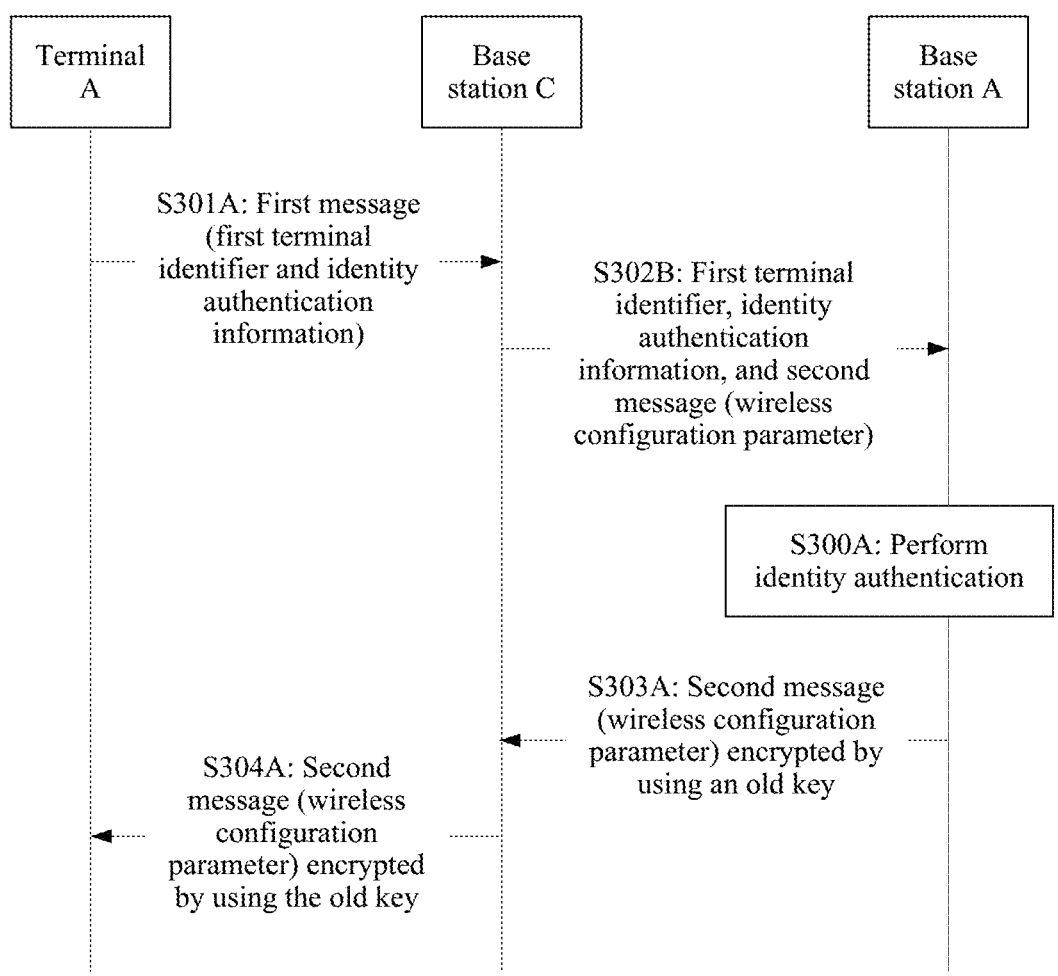
FIG. 6 is still another schematic flowchart of communication between a terminal and a serving base station.

In the second implementation, the second message is generated by the anchor base station. In a variant of the second implementation, the second message may be generated by the serving base station. A third implementation shown in FIG. 6 is a variant based on the second implementation shown in FIG. 5, and the second message is generated by the serving base station. As shown in FIG. 6, the third implementation includes the following steps.

S301A: The terminal A sends a first message to the base station C, where the first message includes a first terminal identifier and identity authentication information.

S302B: The base station C sends the first terminal identifier, the identity authentication information, and a second message to the base station A, where the second message includes a wireless configuration parameter.

Optionally, the base station C may send the first message to the base station A to send the first terminal identifier and the identity authentication information to the base station A. For example, S302B may be: The base station C sends the first message and the second message to the base station A.

Optionally, the base station C may allocate a PDCP SN to the second message, and send the PDCP SN to the base station A.

S300A: The base station A performs identity authentication.

If the authentication fails, the base station A may notify the base station C that the authentication fails, and the base station C may indicate the terminal A to establish a connection, for example, establish an RRC connection. If identity authentication succeeds, S303A may be performed.

S303A: The base station A sends, to the base station C, the second message on which encryption and integrity protection are performed by using an old key.

Optionally, before S303A, the base station A may modify the second message based on an actual communication requirement. For example, information such as an encryption algorithm and an integrity protection algorithm that are selected by the base station A is added to the second message.

S304A: The base station C sends, to the terminal A, the second message on which encryption and integrity protection are performed by using the old key.

After receiving the second message on which encryption and integrity protection are performed by using the old key, the terminal A may perform decryption and integrity authentication by using the old key. The terminal A does not need to first complete negotiation of a new key with the base station C to transmit the wireless configuration parameter, thereby saving air interface signaling interaction overheads. In addition, encryption and integrity protection are performed on the wireless configuration parameter transmitted over an air interface, thereby improving security.

For description of parts in FIG. 6 that are the same as those in FIG. 5 and description of technical features in FIG. 6 that are the same as those in the implementation in FIG. 5, refer to description of the implementation shown in FIG. 5.

Figure 7:
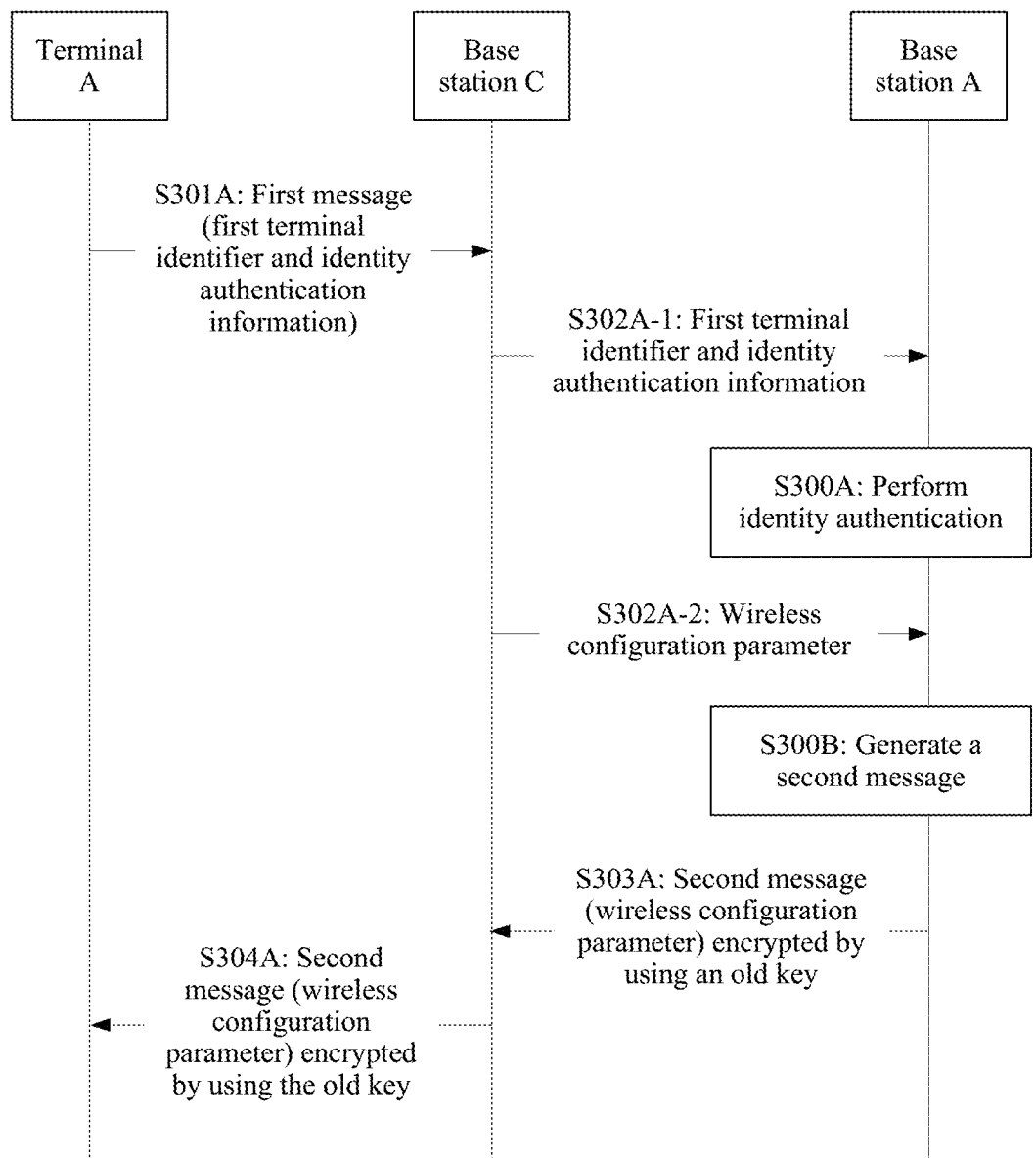
FIG. 7 is still another schematic flowchart of communication between a terminal and a serving base station.

In another variant of the second implementation, the serving base station may send the wireless configuration parameter to the anchor base station after integrity verification performed on the first message succeeds. A fourth implementation shown in FIG. 7 is another variant of the second implementation. As shown in FIG. 7, the fourth implementation includes the following steps.

S301A: The terminal A sends a first message to the base station C, where the first message includes a first terminal identifier and identity authentication information.

S302A-1: The base station C sends the first terminal identifier and the identity authentication information to the base station A.

Optionally, the base station C may send the first message to the base station A to send the first terminal identifier and the identity authentication information to the base station A. For example, S302A-1 may be: The base station C sends the first message to the base station A.

S300A: The base station A performs identity authentication.

If the authentication fails, the base station A may notify the base station C that the authentication fails, and the base station C may indicate the terminal A to establish a connection, for example, establish an RRC connection. If the authentication succeeds, the base station A may notify the base station C of an authentication success result, and the base station C performs S302A-2.

S302A-2: The base station C sends a wireless configuration parameter to the base station A.

Optionally, the base station C may allocate a PDCP SN to the wireless configuration parameter, and send the PDCP SN to the base station A.

S300B: The base station A generates a second message, where the second message includes the wireless configuration parameter.

S303A: The base station A sends, to the base station C, the second message on which encryption and integrity protection are performed by using an old key.

S304A: The base station C sends, to the terminal A, the second message on which encryption and integrity protection are performed by using the old key.

For description of parts in FIG. 7 that are the same as those in FIG. 5 and description of technical features in FIG. 7 that are the same as those in the implementation shown in FIG. 5, refer to description of the implementation shown in FIG. 5.

Figure 8:
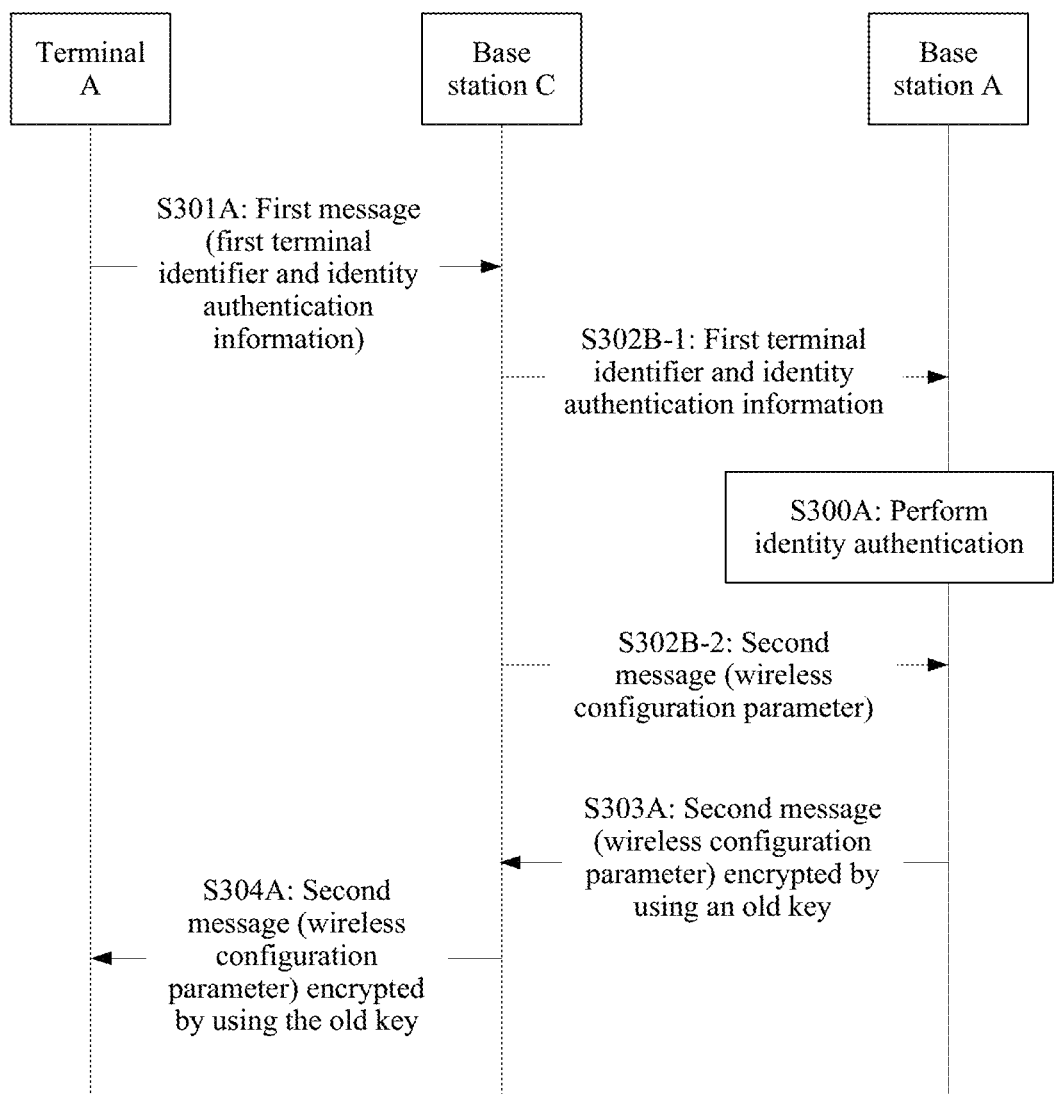
FIG. 8 is still another schematic flowchart of communication between a terminal and a serving base station.

In a variant of the third implementation, the serving base station may send the second message to the anchor base station after integrity verification performed on the first message succeeds. A fifth implementation shown in FIG. 8 is a variant of the third implementation. As shown in FIG. 8, the fifth implementation includes the following steps.

S301A: The terminal A sends a first message to the base station C, where the first message includes a first terminal identifier and identity authentication information.

S302B-1: The base station C sends the first terminal identifier and the identity authentication information to the base station A.

Optionally, the base station C may send the first message to the base station A to send the first terminal identifier and the identity authentication information to the base station A. For example, S302B-1 may be: The base station C sends the first message to the base station A.

S300A: The base station A performs identity authentication.

If the authentication fails, the base station A may notify the base station C that the authentication fails, and the base station C may indicate the terminal A to establish a connection, for example, establish an RRC connection. If the authentication succeeds, the base station A may notify the base station C that the authentication succeeds, and the base station C may perform S302B-2.

S302B-2: The base station C sends a second message to the base station A, where the second message includes a wireless configuration parameter.

Optionally, the base station C may allocate a PDCP SN to the second message, and send the PDCP SN to the base station A.

S303A: The base station A sends, to the base station C, the second message on which encryption and integrity protection are performed by using an old key.

Optionally, before S303A, the base station A may modify the second message based on an actual communication requirement. For example, information such as an encryption algorithm and an integrity protection algorithm is added to the second message.

S304A: The base station C sends, to the terminal A, the second message on which encryption and integrity protection are performed by using the old key.

For description of parts in FIG. 8 that are the same as those in FIG. 6 and description of technical features in FIG. 8 that are the same as those in the implementation shown in FIG. 6, refer to description of the implementation shown in FIG. 6.

Optionally, in the second to the fifth implementations, a parameter of the base station C such as a serving cell identifier may be used in a process of performing identity authentication by the base station A. In this case, the base station C may send, to the base station A, the parameter that is of the base station C and that is required for identity authentication.

In a first optional design, in the first to the fifth implementations, the anchor base station may assist in new key negotiation between the terminal and the serving base station, thereby saving signaling.

For the case in which the anchor base station assists in the new key negotiation between the terminal and the serving base station, the anchor base station may derive the new key based on the old key and a new key derivation parameter, send the new key and the new key derivation parameter to the serving base station, and notify the terminal of the new key derivation parameter. The terminal may derive the same new key based on the new key derivation parameter and the old key. In this way, communication between the terminal and the serving base station may be performed by using the new key. In addition, both the terminal and the serving base station store the new key and the new key derivation parameter, so that the terminal and the serving base station derive a next key based on the new key.

In this design, the new key derivation parameter may be notified to the terminal in an explicit manner, or the new key derivation parameter may be notified to the terminal in an implicit manner.

When the explicit manner is used, the new key derivation parameter may be sent to the terminal. Optionally, the anchor base station may encrypt the new key derivation parameter by using the old key, and send the encrypted new key derivation parameter to the serving base station, and the serving base station forwards the encrypted new key derivation parameter to the terminal, thereby ensuring security of transmission of the new key derivation parameter.

When the implicit manner is used, a new key derivation parameter generation rule may be preset, and the new key derivation parameter does not need to be sent to the terminal. The anchor base station and the terminal each may generate a same new key derivation parameter according to the new key derivation parameter generation rule, and the anchor base station sends the new key derivation parameter to the serving base station. For example, the new key derivation parameter generation rule may be that a value obtained by increasing an old key derivation parameter by 1 is used as the new key derivation parameter, or the new key derivation parameter generation rule may be that an old key derivation parameter is used as the new key derivation parameter. The preset new key derivation parameter generation rule may be specified by a communications standard, or may be negotiated in advance by the terminal and the anchor base station, or may be preconfigured.

To implement the first optional design, the first to the fifth implementations may be modified.

For example, the first to the fifth implementations further include: The base station A derives the new key based on the old key and the new key derivation parameter.

For example, in the first implementation, when the explicit manner is used, the base station A further sends 1) the new key derivation parameter and 2) the new key to the base station C in S303, and the base station C further sends 1) the new key derivation parameter to the terminal A in S304. Alternatively, the base station A further sends, to the base station C in S303, 1) the new key derivation parameter, 2) the new key, and 3) the new key derivation parameter encrypted by using the old key, and the base station C further sends, to the terminal A in S304, 3) the new key derivation parameter encrypted by using the old key.

For another example, in the first implementation, when the implicit manner is used, the base station A further sends 1) the new key derivation parameter and 2) the new key to the base station C in S303, and S304 remains unchanged or the base station C further sends, to the terminal in S304, an indication indicating that the new key derivation parameter is NULL. The base station A generates 1) the new key derivation parameter according to the new key derivation parameter generation rule. If the terminal A does not receive, in S304, the new key derivation parameter or the new key derivation parameter encrypted by using the old key, the terminal A generates 1) the new key derivation parameter according to the new key derivation parameter generation rule, and may derive 2) the new key based on 1) the new key derivation parameter.

For another example, in the second to the fifth implementations, when the explicit manner is used, the base station A further sends 1) the new key derivation parameter and 2) the new key to the base station C in S303A, where the second message in S303A further includes 1) the new key derivation parameter. Therefore, the second message sent to the terminal A in S304A also includes 1) the new key derivation parameter. The new key derivation parameter is carried in the second message, and encryption and integrity protection are performed on the second message, so that security of transmission of the new key derivation parameter can be better ensured. Optionally, if the second message is generated by the base station C, the base station A may send 1) the new key derivation parameter and 2) the new key to the base station C, and the base station C generates the second message including 1) the new key derivation parameter, and sends the generated second message to the base station A. Optionally, 1) the new key derivation parameter and 2) the new key may be carried in a message that is used to notify the base station C that the authentication succeeds, and the message is sent by the base station A to the base station C.

For another example, in the second to the fifth implementations, when the implicit manner is used, the base station A further sends 1) the new key derivation parameter and 2) the new key to the base station C in S303A, where the second message in S303A remains unchanged or the second message further includes an indication indicating that the new key derivation parameter is NULL. After receiving the second message, the terminal A may generate the new key derivation parameter according to the new key derivation parameter generation rule, and derive the new key based on the old key and the new key derivation parameter. In the implicit manner, the new key derivation parameter can be prevented from being transmitted over an air interface, thereby ensuring security and reducing air interface signaling overheads.

In the first optional design, with the assistance of the anchor base station, the same new key and the same new key derivation parameter are stored in both the terminal A and the serving base station (the base station C), thereby completing negotiation of the new key and reducing air interface signaling overheads.

The new key may be used for encryption and integrity protection of communication between the terminal and the serving base station, for example, encryption and integrity protection of communication between the terminal A and the base station C. The new key derivation parameter is used to derive the new key. For example, the new key derivation parameter may be an NCC. In an implementation, the new key may be a base station key (for example, KeNB). Performing encryption by using the new key means that an encryption key (for example, KRRCenc) is derived by using the new key, and that encryption is performed by using the derived encryption key. Performing integrity protection by using the new key means that an integrity protection key (for example, KRRCint) is derived by using the new key, and that integrity protection is performed by using the integrity protection key. For a method for deriving an encryption key and an integrity protection key by using a base station key, and algorithms for performing encryption by using an encryption key and performing integrity protection by using an integrity protection key, refer to related content in the first implementation. For a method for deriving a base station key by using an NCC, refer to, for example, related content in Annex A.5 of 3GPP TS 33.401.

Optionally, a parameter of the base station C such as a serving cell identifier may be used in a process of deriving the new key by the base station A. In this case, the base station C may send, to the base station A, the parameter that is of the base station C and that is required for deriving the new key.

In a second optional design, in the first to the fifth implementations, a security algorithm between the terminal and the serving base station may be selected by the anchor base station, thereby saving signaling. The security algorithm includes an encryption algorithm or an integrity protection algorithm, that is, an algorithm for performing encryption or an algorithm for performing integrity protection by using the new key. The security algorithm may be referred to as a security algorithm associated with the new key.

The anchor base station may select a proper security algorithm, and notify the serving base station and the terminal of the security algorithm. In this way, a same security algorithm may be used between the terminal and the serving base station to implement communication encryption or integrity protection.

In this design, the security algorithm may be notified to the terminal in an explicit manner, or the security algorithm may be notified to the terminal in an implicit manner.

When the explicit manner is used, the security algorithm may be sent to the terminal. Optionally, the anchor base station may encrypt the security algorithm by using the old key, and send the encrypted security algorithm to the serving base station, and the serving base station forwards the encrypted security algorithm to the terminal, thereby ensuring security of transmission of the security algorithm. Optionally, the serving base station may send, to the anchor base station, a security algorithm supported by the serving base station, and the anchor base station may select a proper security algorithm from the security algorithm supported by the serving base station.

When the implicit manner is used, a security algorithm selection rule may be preset, and the security algorithm does not need to be sent to the terminal. The anchor base station and the terminal each may select a same security algorithm according to the security algorithm selection rule, and the anchor base station sends the selected security algorithm to the serving base station. For example, the security algorithm selection rule may be an encryption algorithm whose selection index is 0, or the security algorithm selection rule may be an integrity protection algorithm whose selection index is 1, or the security algorithm selection rule may be an encryption algorithm whose selection index is 0 and an integrity protection algorithm whose index is 2. The preset security algorithm selection rule may be specified by a communications standard or may be preconfigured. In this design, the security algorithm used between the terminal and the serving base station does not need to be negotiated through air interface signaling, thereby reducing air interface resource overheads.

To implement the second optional design, the first to the fifth implementations may be modified.

For example, in the first implementation, when the explicit manner is used, the base station A further sends 1) the security algorithm to the base station C in S303, and the base station C further sends 1) the security algorithm to the terminal A in S304. Alternatively, the base station A further sends, to the base station C in S303, 1) the security algorithm and 2) the security algorithm encrypted by using the old key, and the base station C further sends, to the terminal A in S304, 2) the security algorithm encrypted by using the old key. Optionally, the first implementation may further include: The base station C sends, to the base station A, a security algorithm supported by the base station C.

For another example, in the first implementation, when the implicit manner is used, the base station A further sends 1) the security algorithm to the base station C in S303, and S304 remains unchanged or the base station C further sends, to the terminal in S304, an indication indicating that the security algorithm is NULL. The base station A selects 1) the security algorithm according to the security algorithm selection rule. If the terminal A does not receive the security algorithm in S304, the terminal A selects 1) the security algorithm according to the security algorithm selection rule.

For another example, in the second to the fifth implementations, when the explicit manner is used, the base station A further sends 1) the security algorithm to the base station C in S303A, where the second message in S303A further includes 1) the security algorithm. Therefore, the second message sent to the terminal A in S304A also includes 1) the security algorithm. The security algorithm is carried in the second message, and encryption and integrity protection are performed on the second message, so that security of transmission of the security algorithm can be better ensured. Optionally, the second to the fifth implementations may further include: The base station C sends, to the base station A, a security algorithm supported by the base station C. Optionally, if the second message is generated by the base station C, the base station A may send 1) the security algorithm to the base station C, and the base station C generates the second message including 1) the security algorithm, and sends the generated second message to the base station A. Optionally, 1) the security algorithm may be carried in a message that is used to notify the base station C that the authentication succeeds, and the message is sent by the base station A to the base station C.

For another example, in the second to the fifth implementations, when the implicit manner is used, the base station A further sends 1) the security algorithm to the base station C in S303A, where the second message in S303A remains unchanged or the second message further includes an indication indicating that the security algorithm is NULL. The base station A selects 1) the security algorithm according to the security algorithm selection rule. After receiving the second message, the terminal A may select 1) the security algorithm according to the security algorithm selection rule. In the implicit manner, the security algorithm can be prevented from being transmitted over an air interface, thereby ensuring security and reducing air interface signaling overheads.

In the second optional design, with the assistance of the anchor base station, the same security algorithm is used on both the terminal A and the serving base station (the base station C), thereby completing negotiation of the security algorithm and reducing air interface signaling overheads.

A third optional design is a variant of the second optional design. In the third optional design, the anchor base station assists in security algorithm negotiation between the serving base station and the terminal, thereby saving signaling.

The anchor base station may send, to the serving base station, a security algorithm supported by the terminal, and the serving base station selects a proper security algorithm from the security algorithm supported by the terminal, and notifies the terminal of the selected security algorithm. In this way, the terminal and the serving base station do not need to notify, through an air interface, security algorithms separately supported by the terminal and the serving base station, so that air interface resources are saved.

To implement the third optional design, the first to the fifth implementations may be modified.

For example, in the first implementation, the base station A further sends, to the base station C in S303, 1) the security algorithm supported by the terminal A, and the base station C further sends 2) the security algorithm to the terminal A in S304.

For another example, in the second to the fifth implementations, the base station A further sends, to the base station C in S303A, 1) the security algorithm supported by the terminal A, and the base station C further sends 2) the security algorithm to the terminal A in S304A.

2) The security algorithm is selected from 1) the security algorithm supported by the terminal A.

In a fourth optional design, in the first to the fifth implementations, a security algorithm selection rule may be preset, and the terminal and the serving base station each may select a same security algorithm according to the security algorithm selection rule. In this design, the security algorithm used between the terminal and the serving base station does not need to be negotiated through air interface signaling, thereby reducing air interface resource overheads.

In a fifth optional design, in the first to the fifth implementations, the anchor base station may send a context of the terminal to the serving base station, so that the serving base station provides a communications service for the terminal. For example, the first to the fifth implementations further include: The base station A sends the context of the terminal A to the base station C.

In a sixth optional design, in the first to the fifth implementations, whether the wireless configuration parameter or the second message is encrypted may be indicated to the terminal, thereby simplifying implementation of the terminal. For example, information indicating whether the wireless configuration parameter or the second message is encrypted may be carried in a header of a packet data convergence protocol (packet data convergence protocol, PDCP) packet in which the wireless configuration parameter or the second message is encapsulated.

Solution 2

The following describes implementations of Solution 2. Solution 2 has a plurality of optional implementations. For technical features of Solution 2 that are the same as those of Solution 1, refer to related content of Solution 1.

Figure 9:
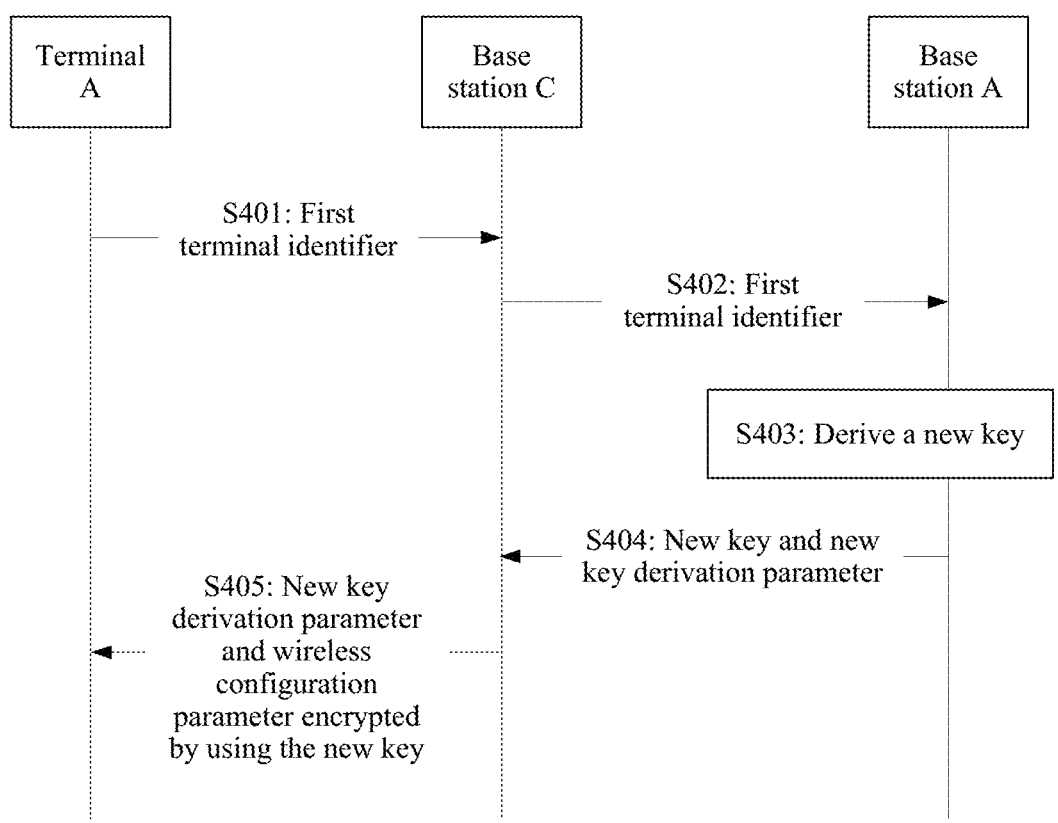
FIG. 9 is still another schematic flowchart of communication between a terminal and a serving base station.

FIG. 9 shows a first implementation of Solution 2. As shown in FIG. 9, a terminal A is in a third state, a base station A is an anchor base station of the terminal A, and the terminal A selects a base station C as a serving base station of the terminal A.

S401: The terminal A sends a first terminal identifier to the base station C, where the first terminal identifier is associated with the base station A, and the first terminal identifier is used to identify the terminal A and the base station A.

S402: The base station C sends the first terminal identifier to the base station A.

Because the first terminal identifier is associated with the base station A, the base station C may determine the base station A based on the first terminal identifier.

S403: The base station A derives a new key based on an old key and a new key derivation parameter.

S404: The base station A sends the new key and the new key derivation parameter to the base station C.

After receiving the first terminal identifier, the base station A may obtain the new key derivation parameter based on an old key derivation parameter. For example, the old key derivation parameter is used as the new key derivation parameter, or a value obtained by increasing the old key derivation parameter by 1 is used as the new key derivation parameter. In an example, the old key derivation parameter may be an NCC. After obtaining the new key derivation parameter, the base station A may derive the new key based on the old key and the new key derivation parameter.

S405: The base station C sends, to the terminal A, the new key derivation parameter and the wireless configuration parameter encrypted by using the new key.

In this implementation, in an option, the base station A may encrypt the wireless configuration parameter by using the new key, and send, to the base station C, the wireless configuration parameter encrypted by using the new key; and the base station C sends, to the terminal A, the wireless configuration parameter encrypted by using the new key. For example, S402 may be: The base station C sends the first terminal identifier and the wireless configuration parameter to the base station A, and S404 may be: The base station A sends, to the base station C, the new key, the new key derivation parameter, and the wireless configuration parameter encrypted by using the new key. In another option, the base station C may encrypt the wireless configuration parameter by using the new key, and send, to the terminal A, the wireless configuration parameter encrypted by using the new key.

After receiving the new key derivation parameter, the terminal A may derive the new key by using the new key derivation parameter and the old key, and decrypt the encrypted wireless configuration parameter by using the new key, to obtain the wireless configuration parameter. In the first implementation, the terminal A does not need to first complete negotiation of the new key with the base station C to encrypt the wireless configuration parameter by using the new key, thereby reducing air interface signaling overheads. In addition, the wireless configuration parameter transmitted over an air interface is encrypted, thereby ensuring security.

For technical features in the first implementation that are the same as those of Solution 1, refer to related content of Solution 1. For example, for the first terminal identifier in S401, refer to related description of S301. For the new key and the new key derivation parameter in S403 and S404, refer to related description in the first optional design of Solution 1. For the wireless configuration parameter in S405, refer to related description of S302.

Figure 10:
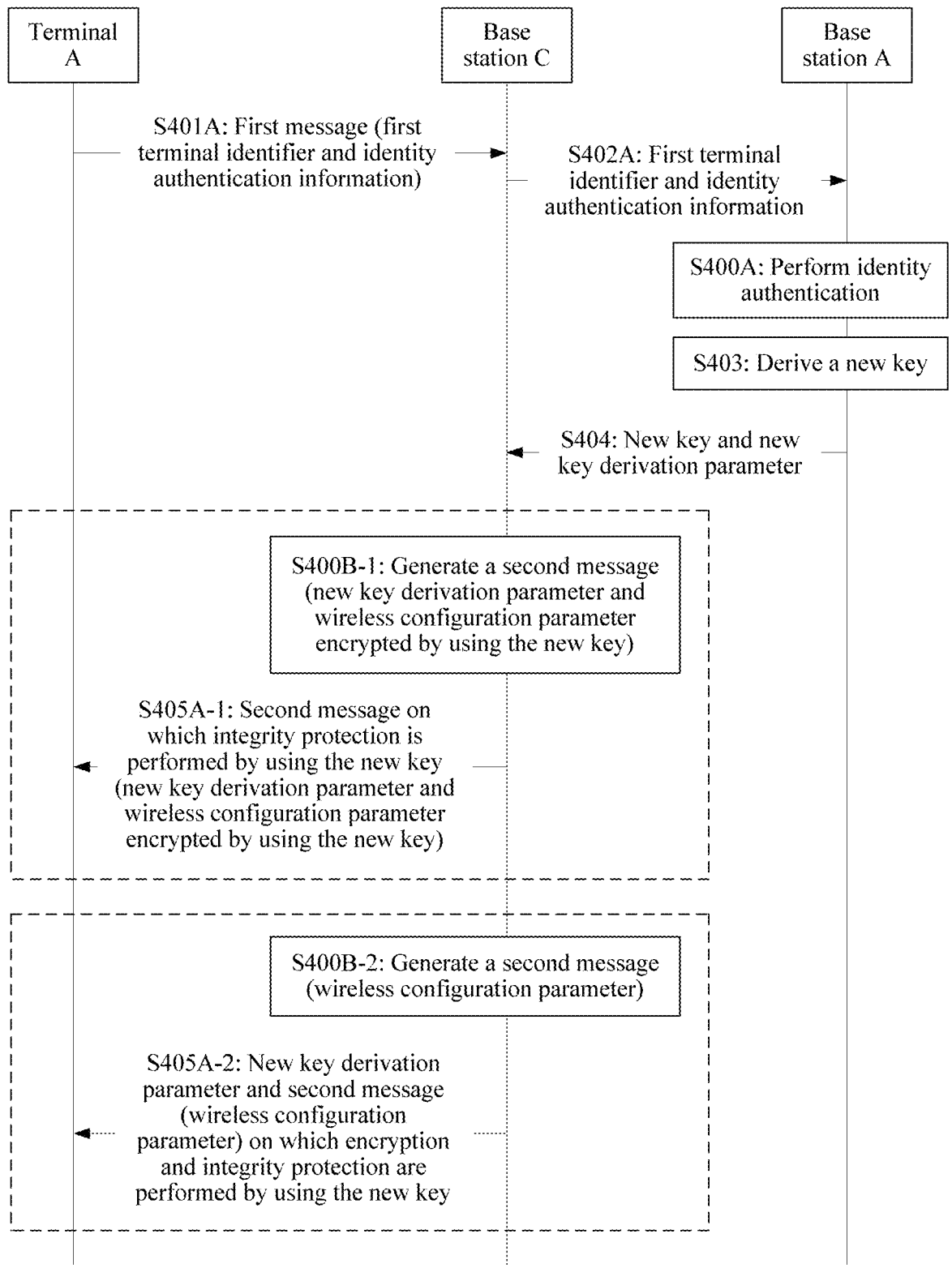
FIG. 10 is still another schematic flowchart of communication between a terminal and a serving base station.

To improve security of an air interface, identity authentication protection may be added to S401 by using the old key, and integrity protection may be added to S405 by using the new key. FIG. o10 shows a second implementation based on the first implementation. As shown in FIG. 10, the second implementation includes the following steps.

S401A: The terminal A sends a first message to the base station C, where the first message includes a first terminal identifier and identity authentication information. The identity authentication information is generated based on an old key, that is, identity authentication protection is performed on the terminal A based on the old key. The identity authentication information may be generated by using an integrity protection algorithm.

S402A: The base station C sends the first terminal identifier and the identity authentication information to the base station A.

Optionally, the base station C may send the first message to the base station A to send the first terminal identifier and the identity authentication information to the base station A. For example, S402A may be: The base station C sends the first message to the base station A.

S400A: The base station A performs identity authentication.

The base station A may perform identity authentication on the terminal A based on the old key and the identity authentication information.

If the authentication fails, the base station A may notify the base station C that the authentication fails, and the base station C may indicate the terminal A to establish a connection, for example, establish an RRC connection. If the authentication succeeds, S403 may be performed.

S403: The base station A derives a new key based on the old key and a new key derivation parameter.

S404: The base station A sends the new key and the new key derivation parameter to the base station C.

S400B-1: The base station C generates a second message, where the second message includes the new key derivation parameter and a wireless configuration parameter encrypted by using the new key.

After receiving the new key, the base station C may encrypt the wireless configuration parameter by using the new key.

S405A-1: The base station C sends, to the terminal A, the second message on which integrity protection is performed by using the new key.

After receiving the second message on which integrity protection is performed, the terminal A may obtain the new key derivation parameter from the second message. After obtaining the new key derivation parameter, the terminal A may derive the new key based on the new key derivation parameter and the old key. After obtaining the new key, the terminal A may perform integrity authentication on the second message, and decrypt the encrypted wireless configuration parameter to obtain the wireless configuration parameter.

Optionally, the new key derivation parameter may be sent to the terminal A without using the second message. For example, S400B-1 and S405A-1 may be replaced with S400B-2 and S405A-2, respectively.

S400B-2: The base station C generates a second message, where the second message includes a wireless configuration parameter.

S405A-2: The base station C sends, to the terminal A, the new key derivation parameter and the second message on which encryption and integrity protection are performed by using the new key. Optionally, the new key derivation parameter may be carried in a MAC control element (MAC CE) of a media access control (MAC) data packet that includes the second message. Optionally, the new key derivation parameter may be carried in a header or a trailer of a PDCP data packet that includes the second message.

The terminal A may obtain the new key derivation parameter from the MAC data packet or the PDCP data packet. After obtaining the new key derivation parameter, the terminal A may derive the new key based on the new key derivation parameter and the old key. After obtaining the new key, the terminal A may perform decryption and integrity authentication on the second message to obtain the wireless configuration parameter.

In the second implementation, the terminal A does not need to first complete negotiation of the new key with the base station C to encrypt the wireless configuration parameter by using the new key, thereby reducing air interface signaling overheads. In addition, the wireless configuration parameter transmitted over an air interface is encrypted, thereby ensuring security. In addition, identity authentication protection is performed in S401A, and integrity protection is performed in S405A-1 and S405-2, thereby further improving security of air interface transmission.

Whether to perform identity authentication protection on the terminal A may be selected based on an actual network requirement. If the first message does not include the identity authentication information, that is, no identity authentication protection is performed on the terminal A, S400A may not be performed.

For description of parts in FIG. 10 that are the same as those in FIG. 9, refer to description in the implementation solution shown in FIG. 9.

For technical features in the second implementation that are the same as those of Solution 1, refer to related content of Solution 1. For example, for description of the old key and performing identity authentication protection based on the old key, refer to related content of S303. For the first terminal identifier, refer to related content of S301. For the identity authentication information, refer to related content of S301A. For the first message, refer to related content of S301A. For identity authentication, refer to description of S300A. For the new key and the new key derivation parameter, refer to related description in the first optional design of Solution 1. For the second message, refer to description of the second message in the second implementation of Solution 1. For performing encryption by using the new key, refer to related content of S303A. For integrity protection, refer to related content of S303A.

Optionally, encryption of the wireless configuration parameter may be implemented by a packet data convergence protocol (PDCP) layer or a MAC layer.

Figure 11A:
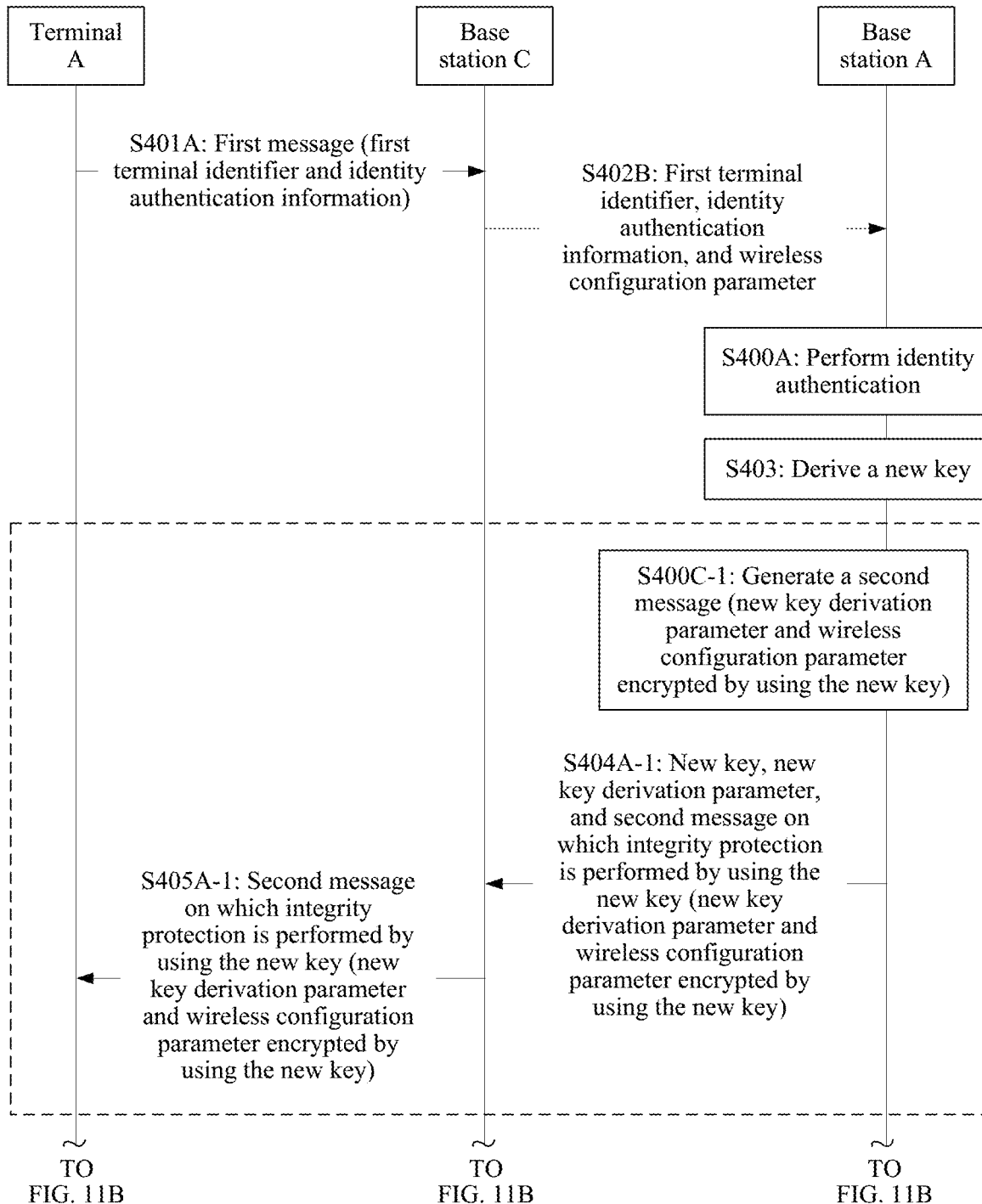
FIG. 11A and FIG. 11B are still another schematic flowchart of communication between a terminal and a serving base station.
Figure 11B:
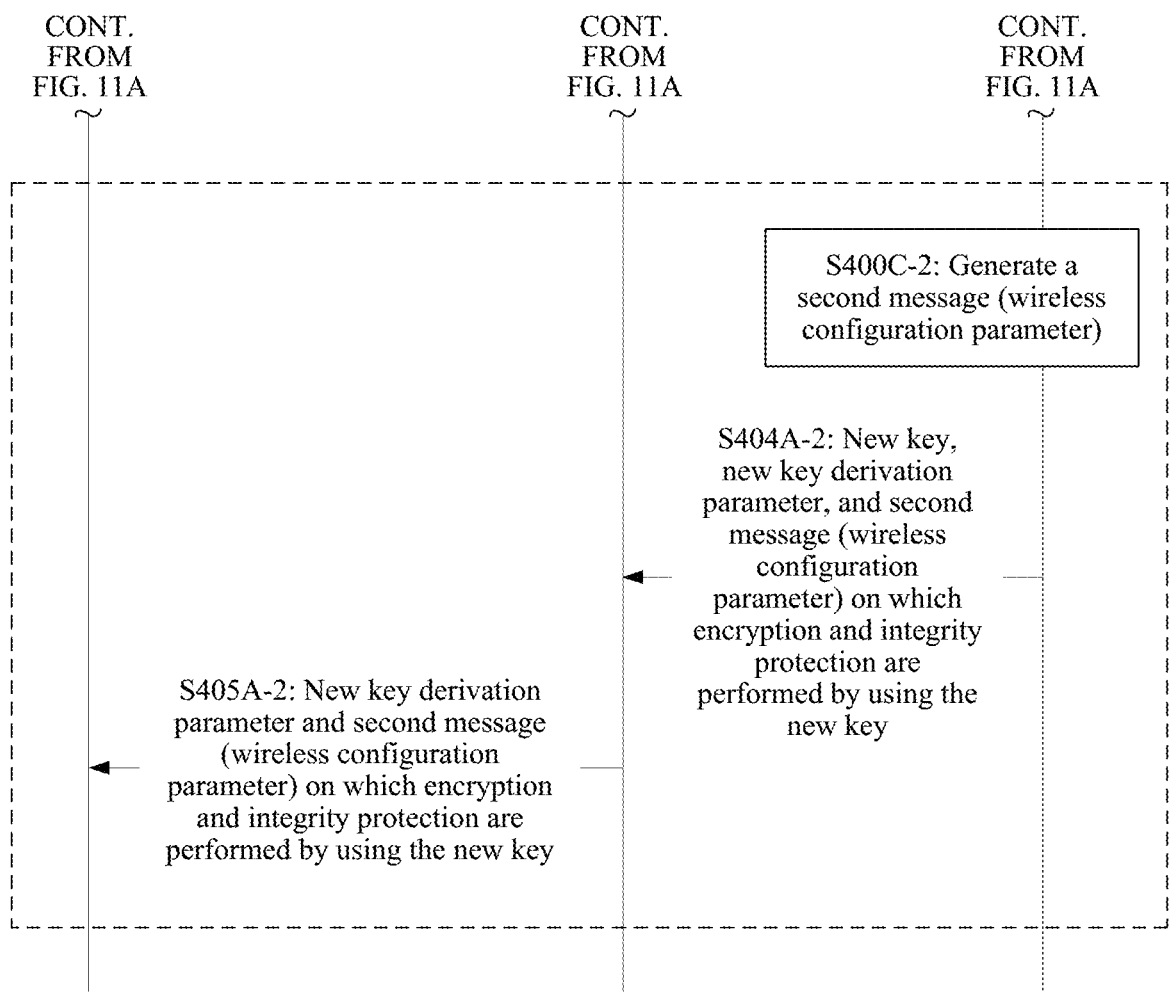

In the second implementation, encryption is performed by the serving base station. In a variant of the second implementation, encryption may be performed by the anchor base station by using the new key. A third implementation shown in FIG. 11A and FIG. 11B is a variant based on the second implementation shown in FIG. 10, and the second message is generated by the anchor base station. As shown in FIG. 11A and FIG. 11B, the third implementation includes the following steps.

S401A: The terminal A sends a first message to the base station C, where the first message includes a first terminal identifier and identity authentication information. The identity authentication information is generated based on an old key, that is, identity authentication protection is performed on the terminal A based on the old key. The identity authentication information may be generated by using an integrity protection algorithm.

S402B: The base station C sends the first terminal identifier, the identity authentication information, and a wireless configuration parameter to the base station A.

Optionally, the base station C may send the first message to the base station A to send the first terminal identifier and the identity authentication information to the base station A. For example, S402B may be: The base station C sends the first message and the wireless configuration parameter to the base station A.

Optionally, the base station C may allocate a PDCP SN to the wireless configuration parameter, and send the PDCP SN to the base station A.

S400A: The base station A performs identity authentication.

The base station A may perform identity authentication on the terminal A based on the old key and the identity authentication information.

If the authentication fails, the base station A may notify the base station C that the authentication fails, and the base station C may indicate the terminal A to establish a connection, for example, establish an RRC connection. If the authentication succeeds, S403 may be performed.

S403: The base station A derives a new key based on the old key and a new key derivation parameter.

S400C-1: The base station A generates a second message, where the second message includes the new key derivation parameter and the wireless configuration parameter encrypted by using the new key.

S404A-1: The base station A sends, to the base station C, the new key, the new key derivation parameter, and the second message on which integrity protection is performed by using the new key.

Optionally, the base station C may obtain the new key derivation parameter from the second message. In this case, S404A-1 is: The base station A sends, to the base station C, the new key and the second message on which integrity protection is performed by using the new key.

S405A-1: The base station C sends, to the terminal A, the second message on which integrity protection is performed by using the new key.

After receiving the second message on which integrity protection is performed, the terminal A may obtain the new key derivation parameter from the second message. After obtaining the new key derivation parameter, the terminal A may derive the new key based on the new key derivation parameter and the old key. After obtaining the new key, the terminal A may perform integrity authentication on the second message, and decrypt the encrypted wireless configuration parameter to obtain the wireless configuration parameter.

Optionally, the new key derivation parameter may be sent to the terminal A without using the second message. For example, S400C-1, S404A-1, and S405A-1 may be replaced with S400C-2, S404A-2, and S405A-2, respectively.

S400C-2: The base station A generates a second message, where the second message includes the wireless configuration parameter.

S404A-2: The base station A sends, to the base station C, the new key, the new key derivation parameter, and the second message on which encryption and integrity protection are performed by using the new key.

S405A-2: The base station C sends, to the terminal A, the new key derivation parameter and the second message on which encryption and integrity protection are performed by using the new key. Optionally, the new key derivation parameter may be carried in a MAC CE of a MIAC data packet that includes the second message. Optionally, the new key derivation parameter may be carried in a header or a trailer of a PDCP data packet that includes the second message.

The terminal A may obtain the new key derivation parameter from the MAC data packet or the PDCP data packet. After obtaining the new key derivation parameter, the terminal A may derive the new key based on the new key derivation parameter and the old key. After obtaining the new key, the terminal A may perform decryption and integrity authentication on the second message to obtain the wireless configuration parameter.

For description of parts in FIG. 11A and FIG. 11B that are the same as those in FIG. 10 and description of technical features in FIG. 11A and FIG. 11B that are the same as those in the implementation shown in FIG. 10, refer to description of the implementation shown in FIG. 10.

Figure 12A:
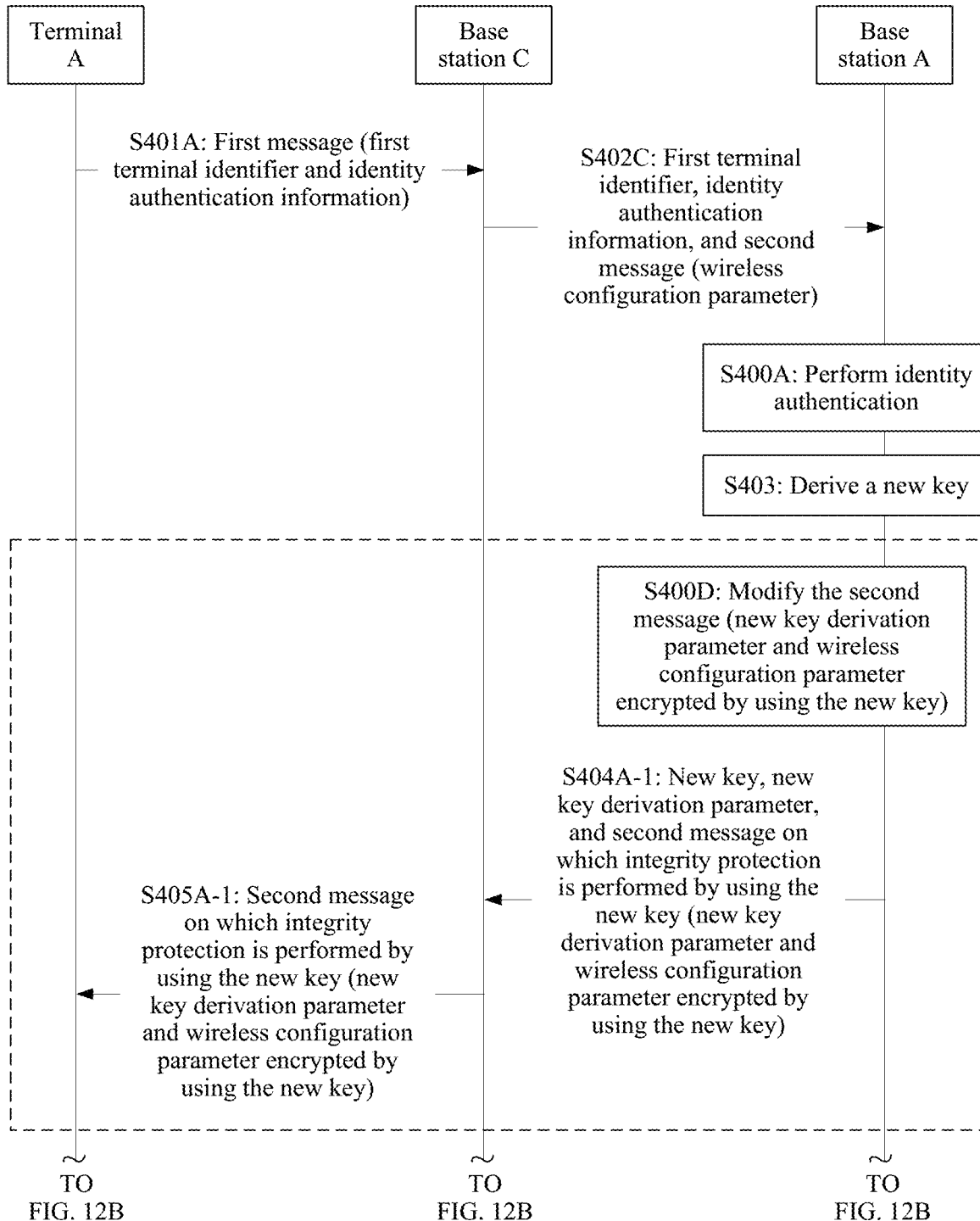
FIG. 12A and FIG. 12B are still another schematic flowchart of communication between a terminal and a serving base station.
Figure 12B:
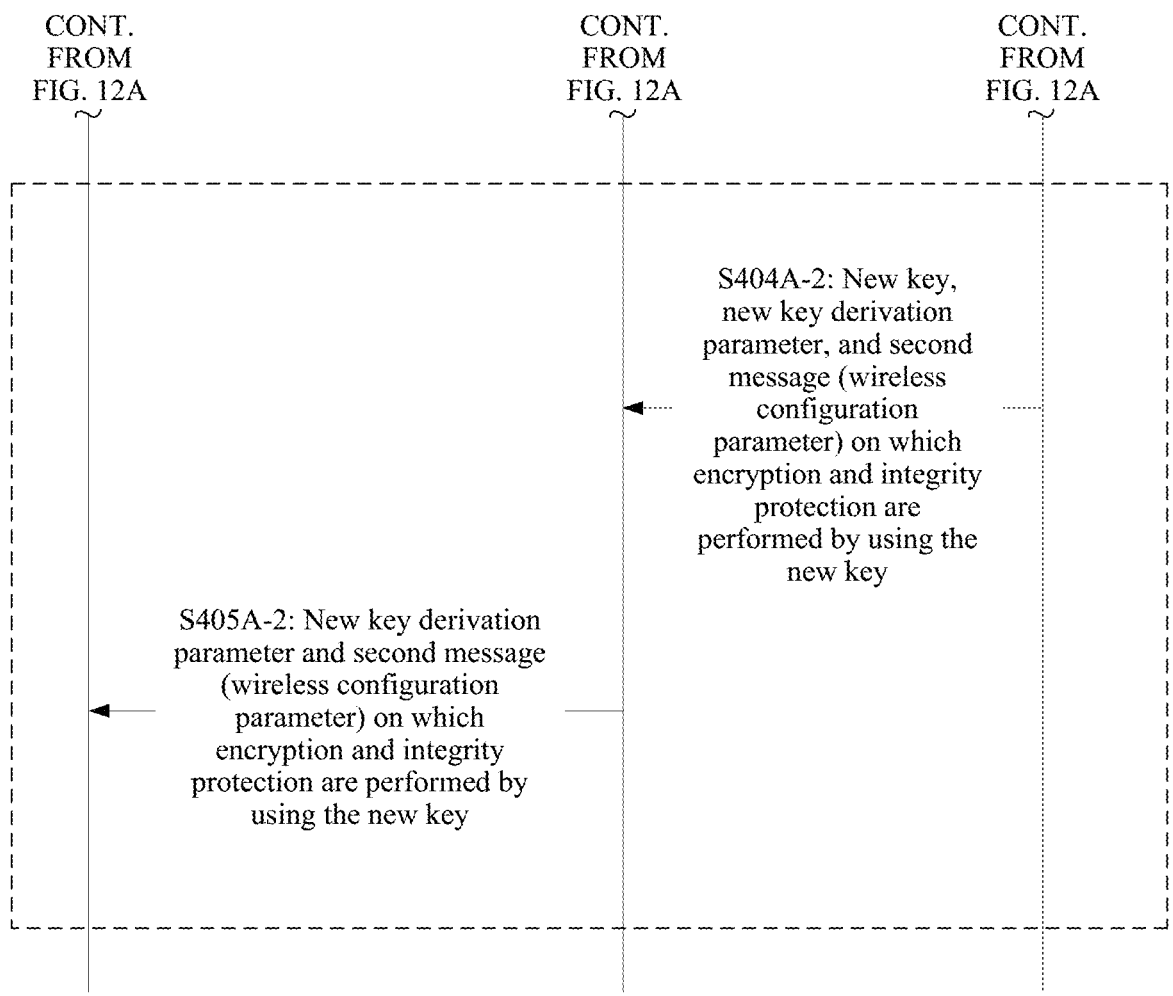

In the third implementation, the second message is generated by the anchor base station. In a variant of the third implementation, the second message may be generated by the serving base station. A fourth implementation shown in FIG. 12A and FIG. 12B show a variant based on the third implementation shown in FIG. 11A and FIG. 11B. As shown in FIG. 12A and FIG. 12B, the fourth implementation includes the following steps.

S401A: The terminal A sends a first message to the base station C, where the first message includes a first terminal identifier and identity authentication information. The identity authentication information is generated based on an old key, that is, identity authentication protection is performed on the terminal A based on the old key. The identity authentication information may be generated by using an integrity protection algorithm.

S402C: The base station C sends the first terminal identifier, the identity authentication information, and a second message to the base station A, where the second message includes a wireless configuration parameter.

Optionally, the base station C may send the first message to the base station A to send the first terminal identifier and the identity authentication information to the base station A. For example, S402C may be: The base station C sends the first message and the second message to the base station A.

Optionally, the base station C may allocate a PDCP SN to the second message, and send the PDCP SN to the base station A.

S400A: The base station A performs identity authentication.

The base station A may perform identity authentication on the terminal A based on the old key and the identity authentication information.

If the authentication fails, the base station A may notify the base station C that the authentication fails, and the base station C may indicate the terminal A to establish a connection, for example, establish an RRC connection. If the authentication succeeds, S403 may be performed.

S403: The base station A derives a new key based on the old key and a new key derivation parameter.

S400D: The base station A modifies the second message, where the modified second message includes the new key derivation parameter and the wireless configuration parameter encrypted by using the new key.

S404A-1: The base station A sends, to the base station C, the new key, the new key derivation parameter, and the second message on which integrity protection is performed by using the new key.

Optionally, the base station C may obtain the new key derivation parameter from the second message. In this case, S404A-1 is: The base station A sends, to the base station C, the new key and the second message on which integrity protection is performed by using the new key.

S405A-1: The base station C sends, to the terminal A, the second message on which integrity protection is performed by using the new key.

After receiving the second message on which integrity protection is performed, the terminal A may obtain the new key derivation parameter from the second message. After obtaining the new key derivation parameter, the terminal A may derive the new key based on the new key derivation parameter and the old key. After obtaining the new key, the terminal A may perform integrity authentication on the second message, and decrypt the encrypted wireless configuration parameter to obtain the wireless configuration parameter.

Optionally, the new key derivation parameter may be sent to the terminal A without using the second message. For example, S400D, S404A-1, and S405A-1 may be replaced with S404A-2 and S405A-2, respectively.

S404A-2: The base station A sends, to the base station C, the new key derivation parameter, the new key, and the second message on which encryption and integrity protection are performed by using the new key.

S405A-2: The base station C sends, to the terminal A, the new key derivation parameter and the second message on which encryption and integrity protection are performed by using the new key.

Optionally, the new key derivation parameter may be carried in a MAC CE of a MAC data packet that includes the second message. Optionally, the new key derivation parameter may be carried in a header or a trailer of a PDCP data packet that includes the second message.

The terminal A may obtain the new key derivation parameter from the MAC data packet or the PDCP data packet. After obtaining the new key derivation parameter, the terminal A may derive the new key based on the new key derivation parameter and the old key. After obtaining the new key, the terminal A may perform decryption and integrity authentication on the second message to obtain the wireless configuration parameter.

For description of parts in FIG. 12A and FIG. 12B that are the same as those in FIG. 11A and FIG. 11B and description of technical features in FIG. 12A and FIG. 12B that are the same as those in the implementation shown in FIG. 11A and FIG. 11B, refer to description of the implementation shown in FIG. 1A and FIG. 11B.

Figure 13A:
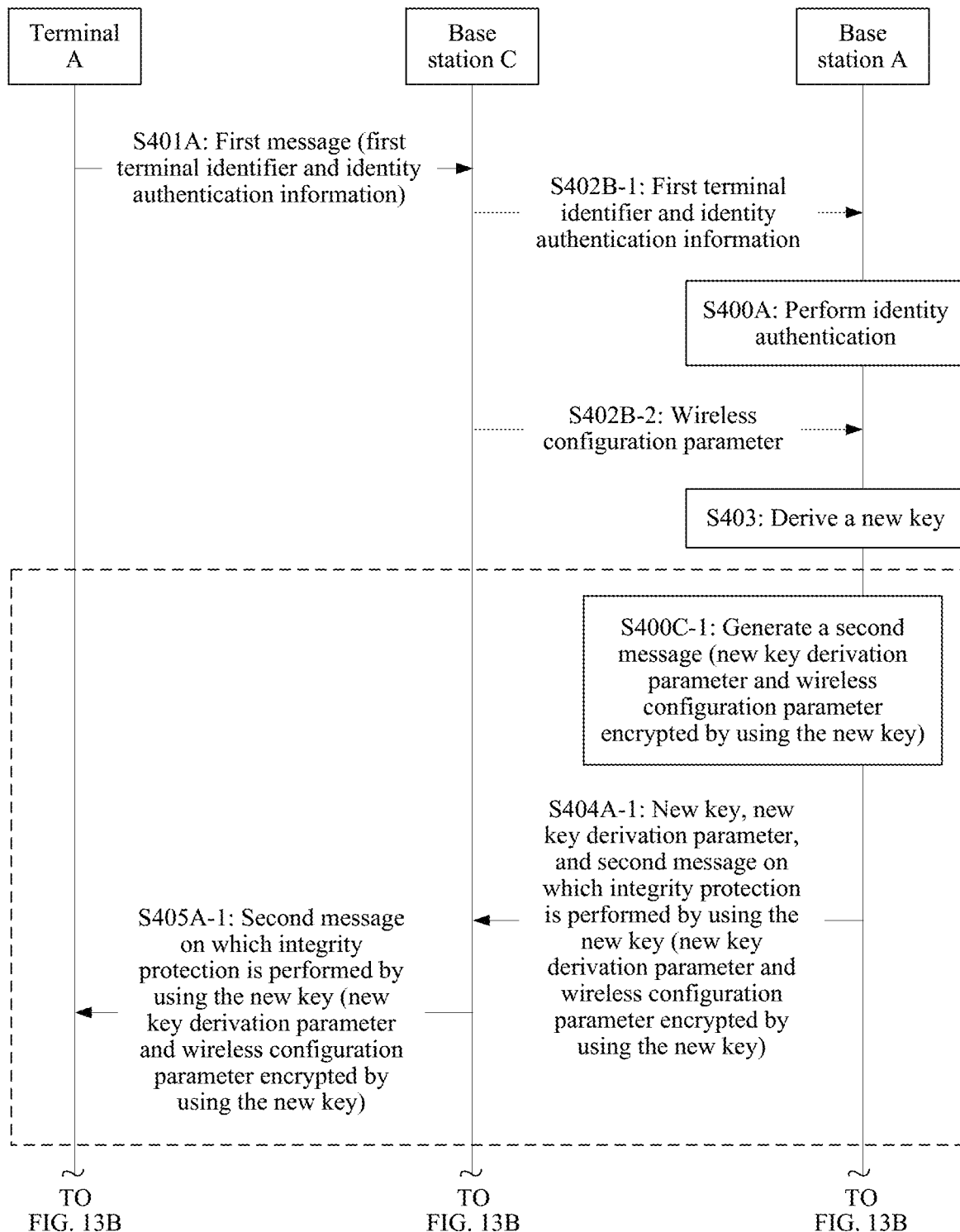
FIG. 13A and FIG. 13B are still another schematic flowchart of communication between a terminal and a serving base station.
Figure 13B:
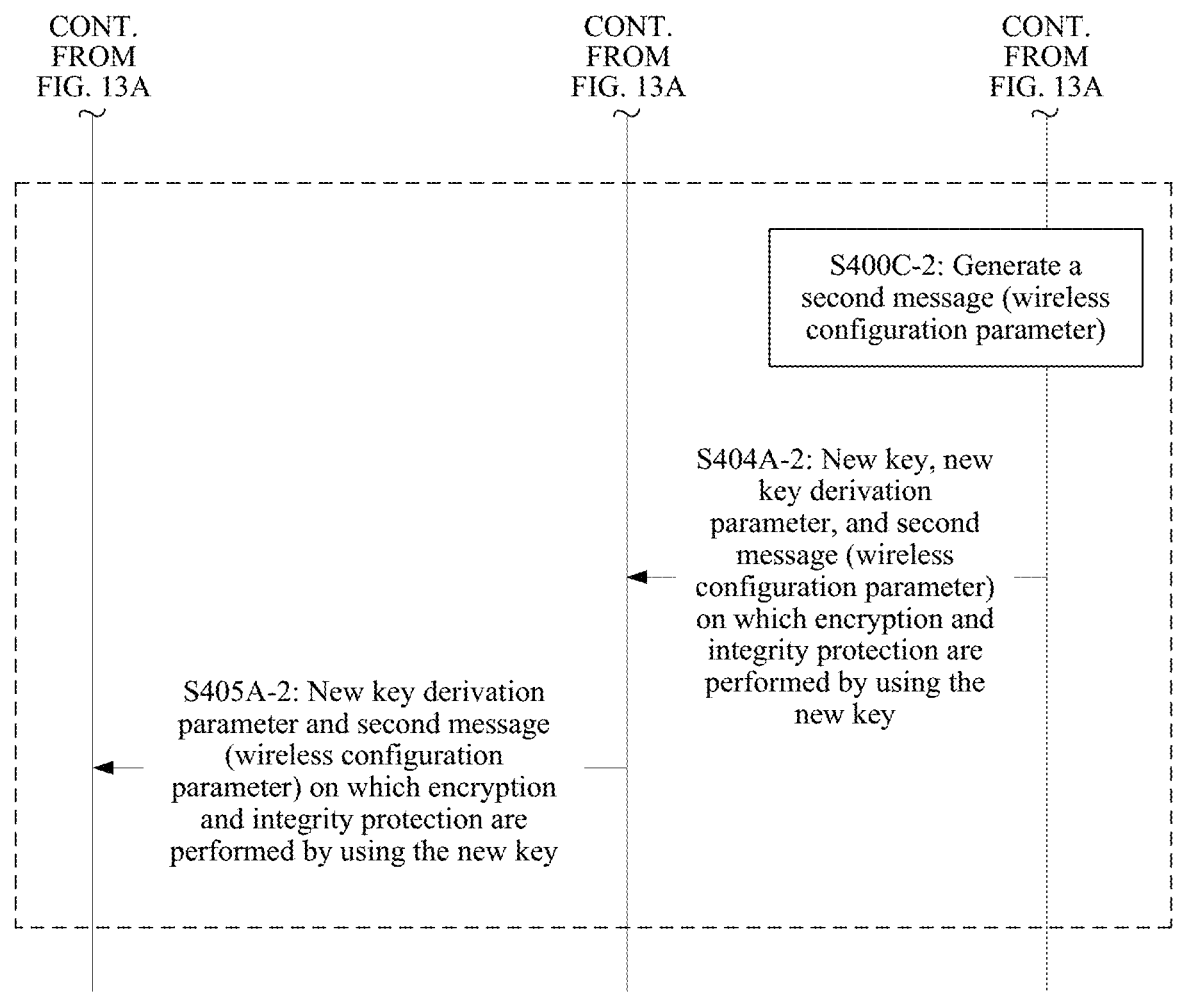

In another variant of the third implementation, the serving base station may send the wireless configuration parameter to the anchor base station after integrity verification performed on the first message succeeds. A fifth implementation shown in FIG. 13A and FIG. 13B show a variant of the third implementation shown in FIG. 11A and FIG. 11B. As shown in FIG. 13A and FIG. 13B, the fifth implementation includes the following steps.

S401A: The terminal A sends a first message to the base station C, where the first message includes a first terminal identifier and identity authentication information. The identity authentication information is generated based on an old key, that is, identity authentication protection is performed on the terminal A based on the old key. The identity authentication information may be generated by using an integrity protection algorithm.

S402B-1: The base station C sends the first terminal identifier and the identity authentication information to the base station A.

Optionally, the base station C may send the first message to the base station A to send the first terminal identifier and the identity authentication information to the base station A. For example, S402B-1 may be: The base station C sends the first message to the base station A.

S400A: The base station A performs identity authentication.

The base station A may perform identity authentication on the terminal A based on the old key and the identity authentication information.

If the authentication fails, the base station A may notify the base station C that the authentication fails, and the base station C may indicate the terminal A to establish a connection, for example, establish an RRC connection. If the authentication succeeds, the base station A may notify the base station C that the authentication succeeds, and the base station C may perform S402B-2.

S402B-2: The base station C sends a wireless configuration parameter to the base station A.

Optionally, the base station C may allocate a PDCP SN to the wireless configuration parameter, and send the PDCP SN to the base station A.

S403: The base station A derives a new key based on the old key and a new key derivation parameter.

S400C-1: The base station A generates a second message, where the second message includes the new key derivation parameter and the wireless configuration parameter encrypted by using the new key.

S404A-1: The base station A sends, to the base station C, the new key, the new key derivation parameter, and the second message on which integrity protection is performed by using the new key.

S405A-1: The base station C sends, to the terminal A, the second message on which integrity protection is performed by using the new key.

After receiving the second message on which integrity protection is performed, the terminal A may obtain the new key derivation parameter from the second message. After obtaining the new key derivation parameter, the terminal A may derive the new key based on the new key derivation parameter and the old key. After obtaining the new key, the terminal A may perform integrity authentication on the second message, and decrypt the encrypted wireless configuration parameter to obtain the wireless configuration parameter.

Optionally, the new key derivation parameter may be sent to the terminal A without using the second message. For example, S400C-1, S404A-1, and S405A-1 may be replaced with S400C-2, S404A-2, and S405A-2, respectively.

S400C-2: The base station A generates a second message, where the second message includes the wireless configuration parameter.

S404A-2: The base station A sends, to the base station C, the new key derivation parameter, the new key, and the second message on which encryption and integrity protection are performed by using the new key.

S405A-2: The base station C sends, to the terminal A, the new key derivation parameter and the second message on which encryption and integrity protection are performed by using the new key.

Optionally, the new key derivation parameter may be carried in a MAC CE of a MAC data packet that includes the second message. Optionally, the new key derivation parameter may be carried in a header or a trailer of a PDCP data packet that includes the second message.

The terminal A may obtain the new key derivation parameter from the MAC data packet or the PDCP data packet. After obtaining the new key derivation parameter, the terminal A may derive the new key based on the new key derivation parameter and the old key. After obtaining the new key, the terminal A may perform decryption and integrity authentication on the second message to obtain the wireless configuration parameter.

For description of parts in FIG. 13A and FIG. 13B that are the same as those in FIG. 11A and FIG. 11B and description of technical features in FIG. 13A and FIG. 13B that are the same as those in the implementation shown in FIG. 11A and FIG. 11B, refer to description of the implementation shown in FIG. 1A and FIG. 11B.

Figure 14A:
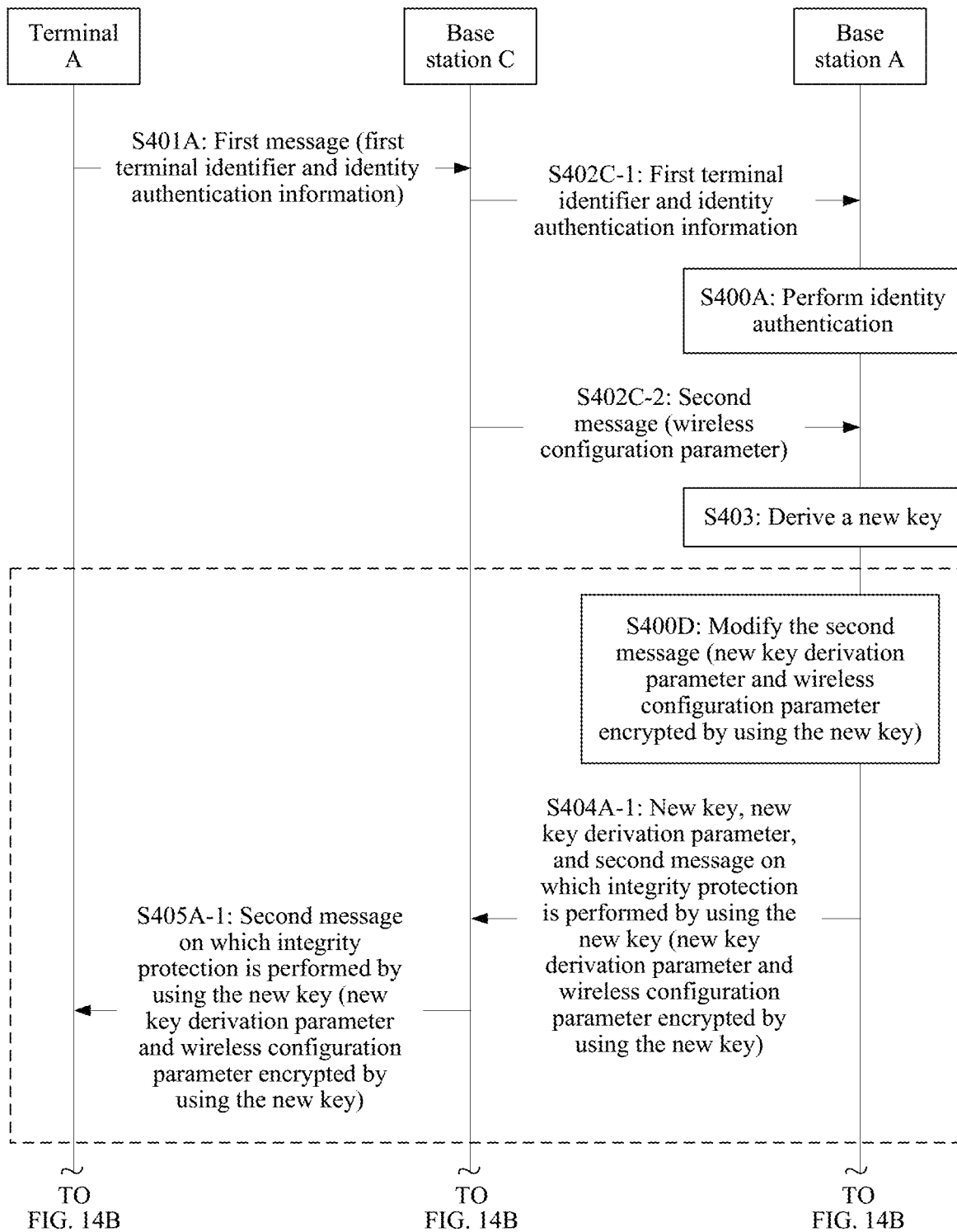
FIG. 14A and FIG. 14B are still another schematic flowchart of communication between a terminal and a serving base station.
Figure 14B:
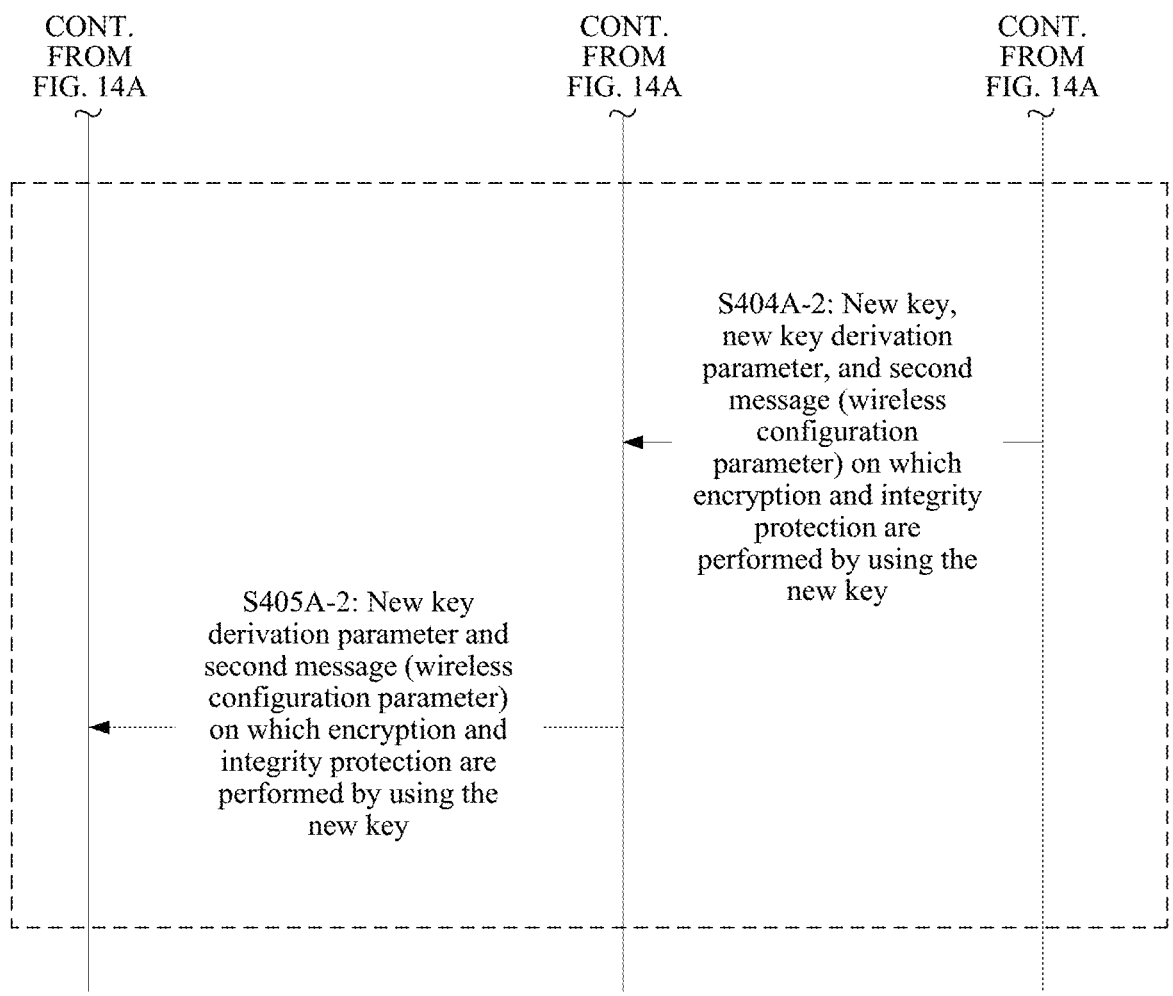

In a variant of the fourth implementation, the serving base station may send the second message to the anchor base station after integrity verification performed on the first message succeeds. A sixth implementation shown in FIG. 14A and FIG. 14B show a variant of the fourth implementation shown in FIG. 12A and FIG. 12B. As shown in FIG. 14A and FIG. 14B, the sixth implementation includes the following steps.

S401A: The terminal A sends a first message to the base station C, where the first message includes a first terminal identifier and identity authentication information. The identity authentication information is generated based on an old key, that is, identity authentication protection is performed on the terminal A based on the old key. The identity authentication information may be generated by using an integrity protection algorithm.

S402C-1: The base station C sends the first terminal identifier and the identity authentication information to the base station A.

Optionally, the base station C may send the first message to the base station A to send the first terminal identifier and the identity authentication information to the base station A. For example, S402C-1 may be: The base station C sends the first message to the base station A.

S400A: The base station A performs identity authentication.

The base station A may perform identity authentication on the terminal A based on the old key and the identity authentication information.

If the authentication fails, the base station A may notify the base station C that the authentication fails, and the base station C may indicate the terminal A to establish a connection, for example, establish an RRC connection. If the authentication succeeds, the base station A may notify the base station C that the authentication succeeds, and the base station C may perform S402C-2.

S402C-2: The base station C sends a second message to the base station A, where the second message includes a wireless configuration parameter.

Optionally, the base station C may allocate a PDCP SN to the second message, and send the PDCP SN to the base station A.

S403: The base station A derives a new key based on the old key and a new key derivation parameter.

S400D: The base station A modifies the second message, where the second message includes the new key derivation parameter and the wireless configuration parameter encrypted by using the new key.

The base station A may encrypt the wireless configuration parameter by using the new key, and modify the second message. The modified second message includes the new key derivation parameter and the wireless configuration parameter encrypted by using the new key.

S404A-1: The base station A sends, to the base station C, the new key, the new key derivation parameter, and the second message on which integrity protection is performed by using the new key.

S405A-1: The base station C sends, to the terminal A, the second message on which integrity protection is performed by using the new key.

After receiving the second message on which integrity protection is performed, the terminal A may obtain the new key derivation parameter from the second message. After obtaining the new key derivation parameter, the terminal A may derive the new key based on the new key derivation parameter and the old key. After obtaining the new key, the terminal A may perform integrity authentication on the second message, and decrypt the encrypted wireless configuration parameter to obtain the wireless configuration parameter.

Optionally, the new key derivation parameter may be sent to the terminal A without using the second message. For example, S400D, S404A-1, and S405A-1 may be replaced with S404A-2 and S405A-2, respectively.

S404A-2: The base station A sends, to the base station C, the new key derivation parameter, the new key, and the second message on which encryption and integrity protection are performed by using the new key.

S405A-2: The base station C sends, to the terminal A, the new key derivation parameter and the second message on which encryption and integrity protection are performed by using the new key.

Optionally, the new key derivation parameter may be carried in a MAC CE of a MAC data packet that includes the second message. Optionally, the new key derivation parameter may be carried in a header or a trailer of a PDCP data packet that includes the second message.

The terminal A may obtain the new key derivation parameter from the MAC data packet or the PDCP data packet. After obtaining the new key derivation parameter, the terminal A may derive the new key based on the new key derivation parameter and the old key. After obtaining the new key, the terminal A may perform decryption and integrity authentication on the second message to obtain the wireless configuration parameter.

For description of parts in FIG. 14A and FIG. 14B that are the same as those in FIG. 12A and FIG. 12B and description of technical features in FIG. 14A and FIG. 14B that are the same as those in the implementation shown in FIG. 12A and FIG. 12B, refer to description of the implementation shown in FIG. 12A and FIG. 12B.

Optionally, in the first to the sixth implementations, a parameter of the base station C such as a serving cell identifier may be used in a process of deriving the new key by the base station A. In this case, the base station C may send the parameter of the base station C to the base station A.

In a first optional design, in the first to the sixth implementations, a security algorithm between the terminal and the serving base station may be selected by the anchor base station, thereby saving signaling. The security algorithm includes an encryption algorithm or an integrity protection algorithm, that is, an algorithm for performing encryption or an algorithm for performing integrity protection by using the new key. In this design, the security algorithm may be notified to the terminal in an explicit manner, or the security algorithm may be notified to the terminal in an implicit manner. For specific content of the design, refer to the second optional design of Solution 1. Optionally, the serving base station may send, to the anchor base station, a security algorithm supported by the serving base station, and the anchor base station selects a proper security algorithm from the security algorithm supported by the serving base station.

To implement the first optional design, the first to the sixth implementations may be modified.

For example, in the first implementation, when the explicit manner is used, the base station A further sends 1) the security algorithm to the base station C in S404, and the base station C further sends 1) the security algorithm to the terminal A in S405.

For another example, in the first implementation, when the implicit manner is used, the base station A further sends 1) the security algorithm to the base station C in S404, and S405 remains unchanged or the base station C further sends, to the terminal in S405, an indication indicating that the security algorithm is NULL. The base station A selects 1) the security algorithm according to a security algorithm selection rule. If the terminal A does not receive the security algorithm in S405, the terminal A selects 1) the security algorithm according to the security algorithm selection rule.

For another example, in the second implementation, when the explicit manner is used, the base station A further sends 1) the security algorithm to the base station C in S404, where the second message generated in S400B-1 further includes 1) the security algorithm, or the second message generated in S400B-2 further includes 1) the security algorithm. Alternatively, the base station C further sends 1) the security algorithm to the terminal A in S405A-2. Optionally, 1) the security algorithm may be carried in a MAC CE of a MAC data packet that includes the second message or a header or a trailer of a PDCP packet that includes the second message.

For another example, in the second implementation, when the implicit manner is used, the base station A further sends, to the base station C in S404, an indication indicating that the security algorithm is NULL, and S400B-1 remains unchanged or the second message generated in S400B-1 further includes the indication indicating that the security algorithm is NULL, or S400B-2 remains unchanged or the second message generated in S400B-1 further includes the indication indicating that the security algorithm is NULL, or S405A-2 remains unchanged or the indication indicating that the security algorithm is NULL is sent in S400B-1.

For another example, in the third implementation and the fifth implementation, when the explicit manner is used, the second message generated by the base station A further includes 1) the security algorithm in S400C-1. Alternatively, the base station A further sends 1) the security algorithm to the base station C in S404A-2, and the base station C further sends 1) the security algorithm to the terminal A in S405A-2. Optionally, 1) the security algorithm may be carried in a MAC CE of a MAC data packet that includes the second message or a header or a trailer of a PDCP data packet that includes the second message.

For another example, in the third implementation and the fifth implementation, when the implicit manner is used, S400C-1 remains unchanged or the second message in S400C-1 further includes an indication indicating that the security algorithm is NULL. Alternatively, the base station A sends 1) the security algorithm to the base station C in S404A-2, and S405A-2 remains unchanged or the base station C further sends, to the terminal A in S405A-2, an indication indicating that the security algorithm is NULL.

For another example, in the fourth implementation and the sixth implementation, when the explicit manner is used, the second message further includes 1) the security algorithm in S400D. Alternatively, the base station A further sends 1) the security algorithm to the base station C in S404A-2, and the base station C further sends 1) the security algorithm to the terminal A in S405A-2. Optionally, 1) the security algorithm may be carried in a MAC CE of a MIAC data packet that includes the second message or a header or a trailer of a PDCP data packet that includes the second message.

For another example, in the fourth implementation and the sixth implementation, when the implicit manner is used, S400D remains unchanged or the second message in S400D further includes an indication indicating that the security algorithm is NULL. Alternatively, the base station A further sends 1) the security algorithm to the base station C in S404A-2, and S405A-2 remains unchanged or the base station C further sends, to the terminal A in S405A-2, an indication indicating that the security algorithm is NULL.

In the first optional design, with the assistance of the anchor base station, the same security algorithm is used on both the terminal A and the serving base station (the base station C), thereby completing negotiation of the security algorithm and reducing air interface signaling overheads.

A second optional design is a variant of the first optional design. In the second optional design, the anchor base station assists in security algorithm negotiation between the serving base station and the terminal, thereby saving signaling.

The anchor base station may send, to the serving base station, a security algorithm supported by the terminal, and the serving base station selects a proper security algorithm from the security algorithm supported by the terminal, and notifies the terminal of the selected security algorithm. In this way, the terminal and the serving base station do not need to notify, through an air interface, security algorithms separately supported by the terminal and the serving base station, so that air interface resources are saved. In the first to the sixth implementations, the base station A may send 1) the security algorithm to the base station C in, for example, S404, S404A-1, and S404A-2, and the base station C may send 2) a security algorithm to the terminal A in, for example, S405A-1, and S405A-2. 2) The security algorithm belongs to 1) the security algorithm supported by the terminal A. For a specific design idea, refer to the third optional design of Solution 1.

In a third optional design, in the first to the sixth implementations, a security algorithm selection rule may be preset, and the terminal and the serving base station each may select a same security algorithm according to the security algorithm selection rule. In this design, the security algorithm used between the terminal and the serving base station does not need to be negotiated through air interface signaling, thereby reducing air interface resource overheads.

In a fourth optional design, in the first to the fifth implementations, the anchor base station may send a context of the terminal to the serving base station, so that the serving base station provides a communications service for the terminal. For example, the first to the sixth implementations further include: The base station A sends the context of the terminal A to the base station C.

In a fifth optional design, in the first to the sixth implementations, whether the wireless configuration parameter or the second message is encrypted may be indicated to the terminal, thereby simplifying implementation of the terminal. For example, information indicating whether the wireless configuration parameter or the second message is encrypted may be carried in a header of a PDCP packet in which the wireless configuration parameter is encapsulated.

Solution 3

This application further provides Solution 3, and Solution 3 is a variant of Solution 1. In Solution 3, an anchor base station sends an old key to a serving base station, and the serving base station encrypts a wireless configuration parameter by using the old key, and sends the encrypted wireless configuration parameter to a terminal.

This solution may be applied to a central unit-distributed unit (central unit-distributed unit, CU-DU) scenario, that is, a base station is split into a CU and one or more DUs. The CU may have processing functions of an RRC layer and a PDCP layer, and the DU may have functions of a radio link control (radio link control, RLC) layer, a MAC layer, and a physical layer. For related content, refer to, for example, content in section 11 of 3GPP TS 38.801 v14.0.0.

In Solution 3, the terminal does not need to negotiate a new key with the serving base station and then the serving base station does not need to use the new key to encrypt the wireless configuration parameter for transmission, thereby saving air interface signaling overheads for negotiating the new key in a communication procedure and ensuring that the wireless configuration parameter is encrypted during air interface transmission. Therefore, security is ensured.

Figure 15:
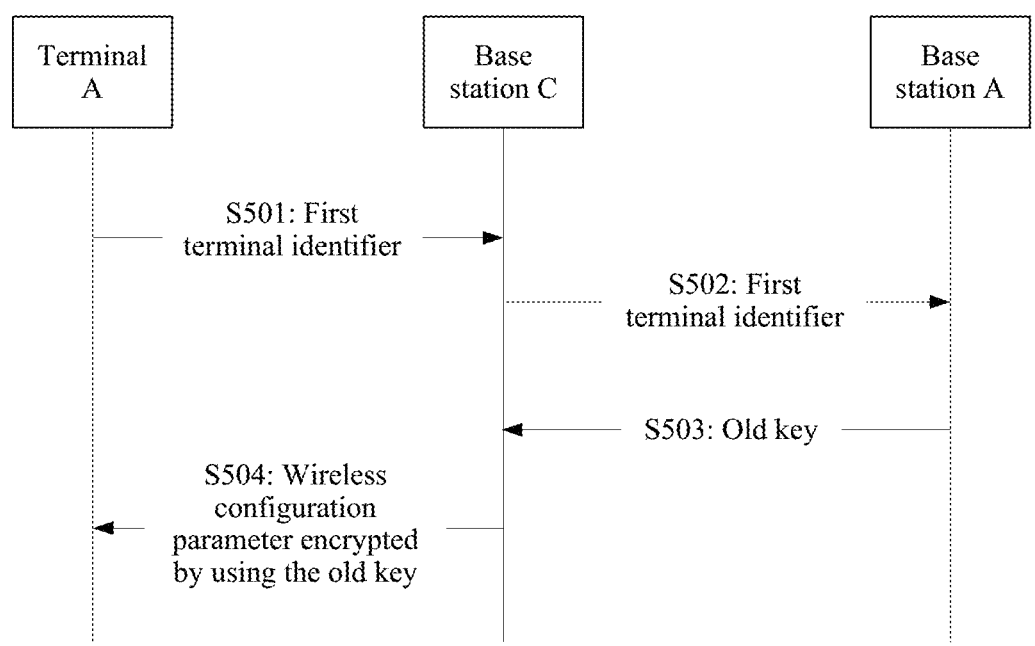
FIG. 15 is still another schematic flowchart of communication between a terminal and a serving base station.

The following describes an implementation of Solution 3. FIG. 15 shows an implementation of Solution 3. As shown in FIG. 15, a terminal A is in a third state, a base station A is an anchor base station of the terminal A, and the terminal A selects a base station C as a serving base station of the terminal A.

S501: The terminal A sends a first terminal identifier to the base station C.

Optionally, the first terminal identifier may be carried in a first message. In this case, S501 may be: The terminal A sends the first message to the base station C, where the first message includes the first terminal identifier.

Optionally, the first message further includes identity authentication information. The first message carries identity authentication information of the terminal A, thereby improving security of air interface transmission.

S502: The base station C sends the first terminal identifier to the base station A.

Optionally, the base station C may further send the identity authentication information to the base station A in S502.

Optionally, the first terminal identifier and the identity authentication information may be carried in the first message. In this case, S502 may be: The base station C sends the first message to the base station A, where the first message includes the first terminal identifier and the identity authentication information.

Optionally, if the base station A receives the carried identity authentication information in S502, the base station A may perform identity authentication by using an old key and the identity authentication information, to ensure that the first message is sent by the terminal A. If the authentication fails, the base station A may notify the base station C that the authentication fails, and the base station C may indicate the terminal A to establish a connection, for example, establish an RRC connection. If integrity authentication succeeds, S503 may be performed.

S503: The base station A sends the old key to the base station C.

S504: The base station C sends, to the terminal A, a wireless configuration parameter encrypted by using the old key.

Optionally, the base station C may add the wireless configuration parameter to a second message and send the second message to the terminal A. In this case, S504 may be: The base station C sends, to the terminal A, the second message encrypted by using the old key, where the second message includes the wireless configuration parameter.

In the implementation shown in FIG. 15, the anchor base station may assist in security negotiation between the serving base station and the terminal.

For example, the implementation shown in FIG. 15 further includes:

S1: The base station A derives a new key based on the old key and a new key derivation parameter.

S2: The base station A sends the new key and the new key derivation parameter to the base station C.

S3: The base station C sends, to the terminal A, the new key derivation parameter encrypted by using the old key.

The terminal A receives the new key derivation parameter encrypted by using the old key, obtains the new key derivation parameter through decryption, and derives the new key based on the old key and the new key derivation parameter.

Optionally, the base station C may add the new key derivation parameter to the second message and send the second message to the terminal A.

Optionally, the base station A may further send a security algorithm to the base station C, and the base station C may further send the security algorithm to the terminal A. The security algorithm sent by the base station A to the base station C is a security algorithm supported by the terminal A. Optionally, the base station C may further send, to the base station A, a security algorithm supported by the base station C, so that the base station A can select a security algorithm supported by both the base station C and the terminal A. Optionally, the base station C may add the security algorithm to the second message and send the second message to the terminal A.

The anchor base station assists in security negotiation between the serving base station and the terminal, thereby saving air interface signaling.

For description of related technical terms and technical means in the implementation shown in FIG. 15, refer to related description of Solution 1.

Solution 4

Figure 16:
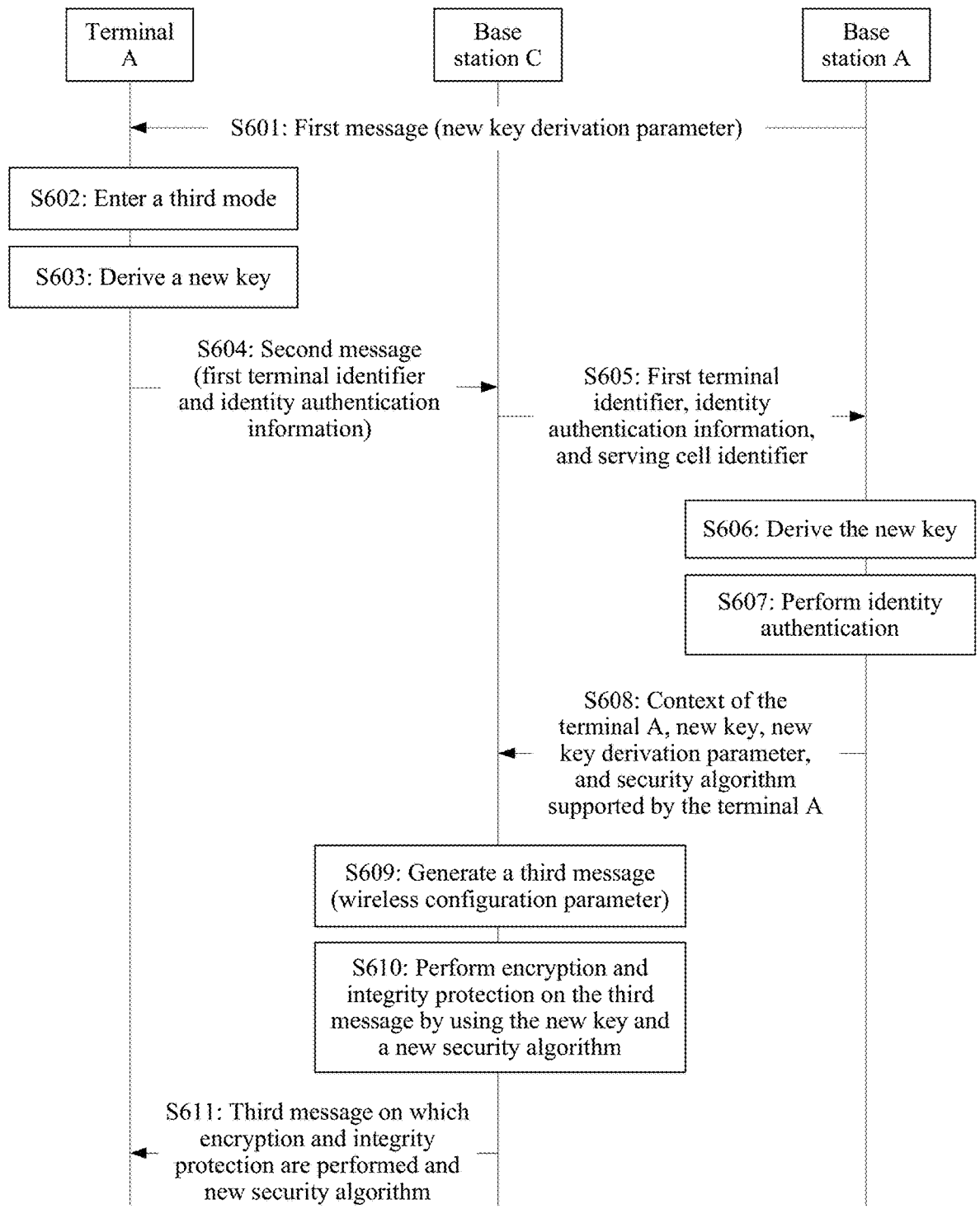
FIG. 16 is still another schematic flowchart of communication between a terminal and a serving base station.

This application further provides Solution 4 to resolve a problem of how to perform security algorithm negotiation on a new key. FIG. 16 shows an implementation of this solution. As shown in FIG. 16, this implementation includes the following steps.

S601: A terminal A receives a first message from a base station A, where the first message includes a new key derivation parameter.

S602: The terminal A enters a third state.

When communicating with an anchor base station, the terminal A obtains the new key derivation parameter. When arriving at a cell of a base station C, the terminal A may use the cell as a serving cell to initiate communication with a network.

S603: The terminal A derives a new key based on an old key, the new key derivation parameter, and a serving cell identifier.

S604: The terminal A sends a second message to the base station C, where the second message includes a first terminal identifier and identity authentication information, and the identity authentication information may be generated based on an integrity protection algorithm of the new key and the old key.

S605: The base station C sends the first terminal identifier, the identity authentication information, and the serving cell identity to the base station A.

Optionally, the base station C may send the second message to the base station A to send the first terminal identifier and the identity authentication information to the base station A. In this case, S605 is: The base station C sends the second message and the serving cell identifier to the base station A.

S606: The base station A derives the new key based on the old key, the new key derivation parameter, and the serving cell identifier.

S607: The base station A performs identity authentication.

The base station A may notify the base station C that the authentication fails, and the base station C may indicate the terminal A to establish a connection, for example, establish an RRC connection. If integrity authentication succeeds, S608 may be performed.

S608: The base station A sends, to the base station C, a context of the terminal A, the new key, the new key derivation parameter, and a security algorithm supported by the terminal A.

S609: The base station C generates a third message, where the third message includes a wireless configuration parameter.

S610: The base station C performs encryption and integrity protection on the third message by using the new key and a new security algorithm.

The new security algorithm is selected from the security algorithm supported by the terminal A. Optionally, the new security algorithm may be the same as a security algorithm associated with the old key.

S611: The base station C sends the third message on which encryption and integrity protection are performed and the new security algorithm to the terminal A. Optionally, a MAC CE of a MAC data packet in which the third message is encapsulated or a header or a trailer of a PDCP data packet in which the third message is encapsulated carries the new security algorithm.

The terminal A stores the old key after deriving the new key, and does not delete the old key until the terminal A successfully receives the third message and until integrity authentication succeeds. In this way, out-of-synchronization with a network side key can be avoided.

In the foregoing method, the base station C may send the encrypted wireless configuration parameter to the terminal A when negotiating the security algorithm with the terminal A, thereby saving air interface signaling.

For technical terms and technical means in FIG. 16, refer to content of Solution 1, Solution 2, and Solution 3.

Persons skilled in the art may understand that the foregoing solutions may be combined with each other. For example, an anchor base station encrypts a new key derivation parameter by using an old key, and sends the encrypted new key derivation parameter to a serving base station. The serving base station encrypts a wireless configuration parameter by using a new key, and the serving base station sends, to a terminal, the wireless configuration parameter encrypted by using the new key and the new key derivation parameter encrypted by using the old key. For another example, an anchor base station encrypts a new key derivation parameter by using an old key, encrypts a wireless configuration parameter by using a new key, and sends, to a serving base station, the new key derivation parameter encrypted by using the old key and the wireless configuration parameter encrypted by using the new key. The serving base station sends, to a terminal, the new key derivation parameter encrypted by using the old key and the wireless configuration parameter encrypted by using the new key. For another example, an anchor base station sends a new key, an old key, and a new key derivation parameter to a serving base station. The serving base station encrypts a wireless configuration parameter by using the new key, encrypts the new key derivation parameter by using the old key, and sends, to a terminal, the wireless configuration parameter encrypted by using the new key and the new key derivation parameter encrypted by using the old key. Optionally, the wireless configuration parameter encrypted by using the new key and the new key derivation parameter encrypted by using the old key may be carried in a same message and the message is sent to the terminal. Optionally, the new key derivation parameter encrypted by using the old key may be first sent to the terminal, and the wireless configuration parameter encrypted by using the new key may be sent after the terminal successfully receives the new key derivation parameter encrypted by using the old key. In this way, it can be ensured that the terminal can obtain the new key derivation parameter, to successfully decrypt the wireless configuration parameter.

In the foregoing solutions, communication between the serving base station and the anchor base station may comply with an interface protocol between the base stations.

To implement the functions of the terminal A in the foregoing solutions, an embodiment of this application provides a communications apparatus.

The communications apparatus may be a terminal. The terminal is a device with a wireless transceiver function. The terminal may be deployed on land, including indoor or outdoor deployment, handheld deployment, or vehicle-mounted deployment, or may be deployed on the water (for example, a ship), or may be deployed in the air (for example, an airplane, a balloon, or a satellite). The terminal device may be a mobile phone (mobile phone), a tablet computer (pad), a computer with a wireless transceiver function, a virtual reality (VR) terminal device, an augmented reality (AR) terminal device, a wireless terminal in industrial control (industrial control), a wireless terminal in self driving, a wireless terminal in remote medical, a wireless terminal in a smart grid, a wireless terminal in transportation safety, a wireless terminal in a smart city, a wireless terminal in a smart home (smart home), or the like.

Figure 17:
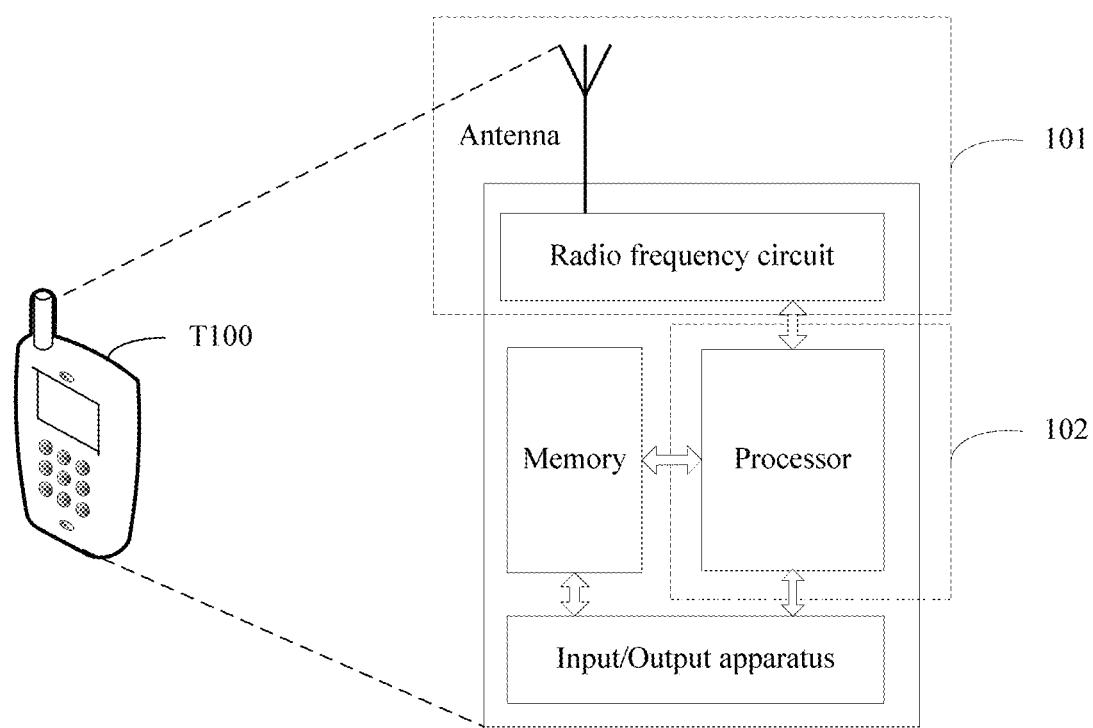
FIG. 17 is a schematic structural diagram of a terminal.

A schematic structural diagram of a terminal T100 may be shown in FIG. 17. For ease of description, FIG. 17 shows only main components of the terminal. As shown in FIG. 17, the terminal T100 includes a processor, a memory, a radio frequency circuit, an antenna, and an input/output apparatus. The processor is mainly configured to: process a communication protocol and communication data, control the terminal, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to transmit/receive a radio frequency signal in an electromagnetic wave form. The input/output apparatus, such as a touchscreen, a display screen, or a keyboard, is mainly configured to: receive data entered by a user and output data to the user. Some types of terminals do not have the input/output apparatus.

After the terminal is powered on, the processor may read the software program (an instruction) from the memory, interpret and execute the instruction of the software program, and process the data of the software program. When the processor needs to send data, after performing baseband processing on the to-be-sent data, the processor outputs a baseband signal to the radio frequency circuit. After performing radio frequency processing on the baseband signal, the radio frequency circuit sends a radio frequency signal in an electromagnetic wave form by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data.

For ease of description, FIG. 17 shows only one memory and one processor. Actual user equipment may include a plurality of processors and memories. The memory may also be referred to as a storage medium, a storage device, or the like. This is not limited in this embodiment of this application.

In an optional implementation, the processor may include a baseband processor and/or a central processing unit. The baseband processor is mainly configured to process the communication protocol and the communication data. The central processing unit is mainly configured to: control the entire terminal, execute the software program, and process the data of the software program. The processor in FIG. 17 integrates functions of the baseband processor and the central processing unit. Persons skilled in the art may understand that the baseband processor and the central processing unit may be alternatively processors independent of each other, and are interconnected by using a technology such as a bus. Optionally, the terminal may include a plurality of baseband processors to adapt to different network standards. Optionally, the terminal may include a plurality of central processing units to enhance a processing capability of the terminal. Optionally, the functions of the baseband processor and the central processing unit may be integrated into one processor for implementation. Optionally, all components of the terminal may be connected through various buses. The baseband processor may also be termed as a baseband processing circuit or a baseband processing chip. The central processing unit may also be termed as a central processing circuit or a central processing chip. Optionally, a function of processing the communication protocol and the communication data may be built in the processor, or may be stored in the storage unit in a form of a software program. The processor executes the software program to implement a baseband processing function.

In this embodiment of this application, the antenna with a wireless transceiver function and the radio frequency circuit may be considered as a transceiver unit of the terminal, and the processor with a processing function may be considered as a processing unit of the terminal. As shown in FIG. 17, the terminal T100 includes a transceiver unit 101 and a processing unit 102. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 101 and that is configured to implement a reception function may be considered as a receiving unit, and a component that is in the transceiver unit 101 and that is configured to implement a sending function may be considered as a sending unit. In other words, the transceiver unit 101 includes the receiving unit and the sending unit. The receiving unit may also be referred to as a receiver, a receiver, a receiver circuit, or the like, and the sending unit may be referred to as a transmitter, a transmitter, a transmitter circuit, or the like.

Optionally, the communications apparatus may be a chip. The chip includes the processing unit 102 and a transceiver component. Data may be exchanged between the processing unit 102 and a memory or a radio frequency unit by using the transceiver component. The transceiver component may be implemented as a circuit, a contact, or a pin. Optionally, the chip may include the memory.

The communications apparatus may be configured to implement the functions of the terminal A in any one of the procedures shown in FIG. 4 to FIG. 16.

In an optional implementation, the processing unit 102 may be configured to implement the functions of the terminal A in any one of the procedures shown in FIG. 4 to FIG. 16.

In another optional implementation, the processing unit 102 may read a program from the memory, so that the communications apparatus implements the related functions of the terminal A in any one of the procedures shown in FIG. 4 to FIG. 16.

An embodiment of this application further provides a computer program product, the program product includes a program, and the program is used to implement the functions of the terminal A in any one of the procedures shown in FIG. 4 to FIG. 16.

An embodiment of this application further provides a computer-readable storage medium, and the storage medium stores the program product.

To implement the functions of the serving base station in the foregoing solutions, an embodiment of this application provides a communications apparatus.

Figure 18:
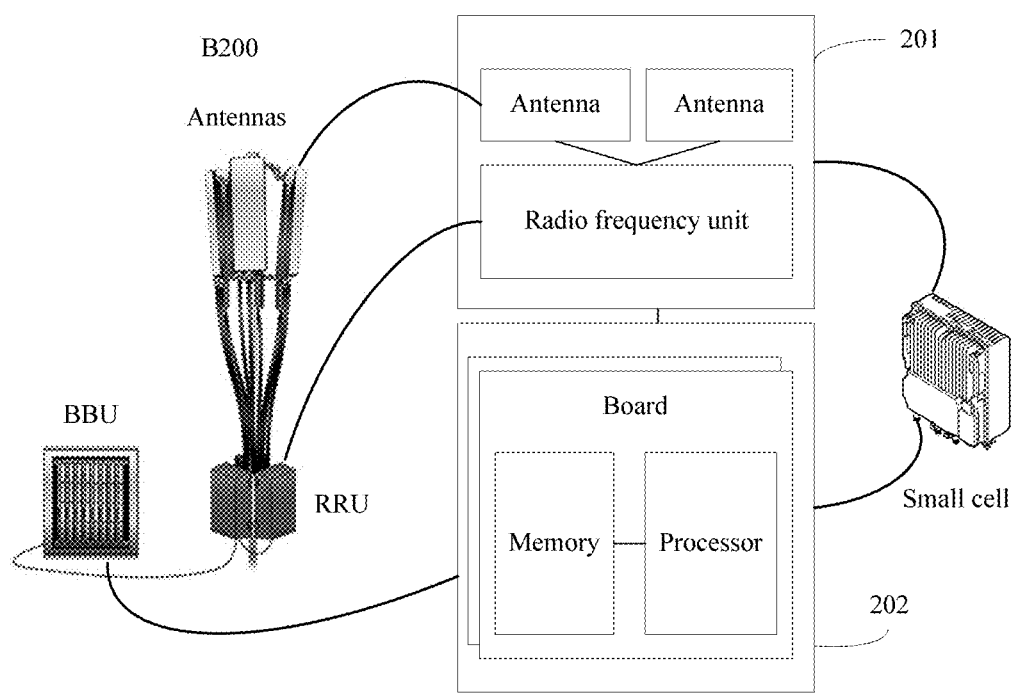
FIG. 18 is a schematic structural diagram of an access network device.

The communications apparatus may be a base station. The base station is a device deployed in a radio access network to provide a wireless communication function. For example, a base station in an LTE network is referred to as an evolved NodeB (eNB or eNodeB), and a base station in an NR network is referred to as a TRP (transmission reception point) or a gNB (generation nodeB, next generation NodeB). A structure of the base station may be shown in FIG. 18. A base station B200 shown in FIG. 18 may be a distributed base station. For example, a distributed base station that includes antennas, a remote radio unit (RRU), and a baseband unit (BBU) is shown on the left of FIG. 18. Alternatively, the base station shown in FIG. 18 may be an integrated base station, such as a small cell shown on the right of FIG. 18. The base station B200 shown in FIG. 18 may be a distributed base station. The base station has a central unit-distributed unit (CU-DU) structure, that is, the base station is split into a CU and one or more DUs. The CU may have processing functions of an RRC layer and a PDCP layer, and the DU may have functions of a radio link control (RLC) layer, a MAC layer, and a physical layer. For related content, refer to, for example, content in section 11 of 3GPP TS 38.801 v14.0.0. Generally, the base station includes a part 201 and a part 202. The part 201 is mainly configured to: receive and transmit a radio frequency signal, and perform conversion between a radio frequency signal and a baseband signal. The part 202 is mainly configured to: perform baseband processing, control the base station, and the like. The part 201 may be usually referred to as a transceiver unit, a transceiver, a transceiver circuit, a transceiver, or the like. The part 202 may be usually referred to as a processing unit. The part 202 is usually a control center of the base station.

In an optional implementation, the part 201 may include an antenna and a radio frequency unit. The radio frequency unit is mainly configured to perform radio frequency processing. Optionally, in the part 201, a component for implementing a reception function may be considered as a receiving unit, and a component for implementing a sending function may be considered as a sending unit. In other words, the part 201 includes the receiving unit and the sending unit. For example, the receiving unit may also be referred to as a receiver, a receiver, a receiver circuit, or the like, and the sending unit may be referred to as a transmitter, a transmitter, a transmitter circuit, or the like.

In an optional implementation, the part 202 may include one or more boards. Each board may include a processor and a memory. The processor is configured to read and execute a program in the memory, to implement a baseband processing function and control on the base station. If a plurality of boards exist, the boards may be interconnected to increase a processing capability.

In another optional implementation, as a system-on-chip (SoC for short) technology develop, a function of the part 202 and a function of the part 201 may be implemented by using the SoC technology. In other words, the function of the part 202 and the function of the part 201 are implemented by using a base station function chip. Components such as a processor, a memory (optional), and an antenna interface are integrated into the base station function chip. A program of a related function of the base station is stored in the memory, and the processor executes the program to implement the related function of the base station.

Optionally, the communications apparatus may be a chip. The chip includes a processor (to facilitate unified description with the processing unit of the base station, the processor of the chip is referred to as a processing unit below) and a transceiver component. Data may be exchanged between the processor and a memory or a radio frequency unit by using the transceiver component. The transceiver component may be implemented as a circuit, a contact, an antenna interface, or a pin. Optionally, the chip may include the memory.

The communications apparatus may be configured to implement the functions of the base station C in any one of the procedures shown in FIG. 4 to FIG. 16.

In an optional implementation, the processing unit may be configured to implement the functions of the base station C in any one of the procedures shown in FIG. 4 to FIG. 16.

In another optional implementation, the processing unit may read a program from the memory, so that the communications apparatus implements the related functions of the base station C in any one of the procedures shown in FIG. 4 to FIG. 16.

An embodiment of this application further provides a computer program product, the program product includes a program, and the program is used to implement the functions of the base station C in any one of the procedures shown in FIG. 4 to FIG. 16.

An embodiment of this application further provides a computer-readable storage medium, and the storage medium stores the program product.

To implement the functions of the anchor base station in the foregoing solutions, an embodiment of this application provides a communications apparatus. The communications apparatus may be a base station or a chip. A structure of the base station may be shown in FIG. 18. The chip includes a processor (to facilitate unified description with the processing unit of the base station, the processor of the chip is referred to as a processing unit below) and a transceiver component. Data may be exchanged between the processor and a memory or a radio frequency unit by using the transceiver component. The transceiver component may be implemented as a circuit, a contact, an antenna interface, or a pin. Optionally, the chip may include the memory.

The communications apparatus may be configured to implement the functions of the base station A in any one of the procedures shown in FIG. 4 to FIG. 16.

In an optional implementation, the processing unit may be configured to implement the functions of the base station A in any one of the procedures shown in FIG. 4 to FIG. 16.

In another optional implementation, the processing unit may read a program from the memory, so that the communications apparatus implements the related functions of the base station A in any one of the procedures shown in FIG. 4 to FIG. 16.

An embodiment of this application further provides a computer program product, the program product includes a program, and the program is used to implement the functions of the base station A in any one of the procedures shown in FIG. 4 to FIG. 16.

An embodiment of this application further provides a computer-readable storage medium, and the storage medium stores the program product.

In this application, a base station may have different names. To avoid a limitation, the serving base station in this application may be replaced with a serving device, and the anchor base station may be replaced with an anchor device.

Persons skilled in the art should know that the foregoing different optional parts/implementations may be combined and replaced based on different network requirements.

In the several embodiments provided in this application, it should be understood that the disclosed apparatus and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware in addition to a software functional unit.

The software function part may be stored in a storage unit. The storage unit includes several indications for indicating a computer device (which may be a personal computer, a server, or a network device) or a processor to perform some of the steps of the methods described in the embodiments of this application. The storage unit includes one or more memories, such as a read-only memory (ROM), a random access memory (RAM), and an electrically erasable programmable read-only memory (EEPROM). The storage unit may independently exist, or may be integrated into the processor.

It may be clearly understood by persons skilled in the art that, for ease of convenience and brief description, division of the foregoing function modules is used as an example for illustration. In actual application, the foregoing functions can be allocated to different function modules and implemented based on a requirement, that is, an inner structure of an apparatus is divided into different function modules to implement all or some of the functions described above. For a detailed working process of the foregoing apparatus, refer to a corresponding process in the foregoing method embodiment. Details are not described herein again.

Persons of ordinary skill in the art may understand that first, second, and various reference numerals in this specification are for distinguishing only for ease of description, and are not used to limit a scope of the embodiments of this application.

Persons of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions in the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method, comprising:
receiving, by a first base station, a cell identifier from a second base station;
generating, by the first base station, a radio resource control (RRC) release message, wherein encryption and integrity protection are performed by the first base station on the radio resource control release message using a first key, the radio resource control release message indicates to a terminal to maintain in an RRC inactive state or to enter an RRC idle state, and the first key is derived based on a second key, and wherein the second key is usable by the terminal in a connected state and in communication with the first base station, and wherein the first base station is an anchor base station which reserves a context of the terminal when the terminal is in the RRC inactive state; and
sending, by the first base station, the radio resource control release message to the second base station; and
wherein the first key being derived based on the second key comprises the first key being derived based on the second key, a key derivation parameter, and a cell identifier of a cell belonging to the second base station;
wherein the key derivation parameter comprises a next hop chaining count.

2. The method according to claim 1, wherein the radio resource control release message indicates to the terminal to maintain in the RRC inactive state.

3. The method according to claim 1, wherein the radio resource control release message indicates to the terminal to enter the RRC idle state.

4. A method, comprising:
transmitting, by a second base station to a first base station, a cell identifier of a cell belonging to the second base station;
receiving, by the second base station, a radio resource control (RRC) release message, wherein encryption and integrity protection are performed by the first base station on the radio resource control release message using a first key, the radio resource control release message is from the first base station, the radio resource control release message indicates to a terminal to maintain in an (RRC) inactive state or to enter an RRC idle state, and the first key is derived based on a second key, wherein the second key is usable by the terminal in a connected state and in communication with the first base station, and wherein the first base station is an anchor base station which reserves a context of the terminal when the terminal is in the RRC inactive state; and
transmitting the radio resource control release message to the terminal; and
wherein the first key being derived based on the second key comprises the first key being derived based on the second key, a key derivation parameter, and the cell identifier of the cell belonging to the second base station;
wherein the key derivation parameter comprises a next hop chaining count.

5. The method according to claim 4, further comprising:
receiving, by the second base station, a radio resource control connection resume request from the terminal.

6. The method according to claim 5, wherein the radio resource control connection resume request comprises an identifier and identity authentication information of the terminal.

7. A communication system, comprising:
a first base station; and
a second base station;
wherein the first base station is configured to:
receive, from the second base station, a cell identifier of a cell belonging to the second base station;
generate a radio resource control (RRC) release message, and send the RRC release message to the second base station, wherein encryption and integrity protection are performed by the first base station on the radio resource control release message using a first key, the radio resource control release message indicates to a terminal to maintain in an RRC inactive state or to enter an RRC idle state, and the first key is derived based on a second key, wherein the second key is usable by the terminal in a connected state and in communication with the first base station, and wherein the first base station is an anchor base station which reserves a context of the terminal when the terminal is in the RRC inactive state; and
wherein the second base station is configured to receive the RRC release message from the first base station and transmit the RRC release message to the terminal; and
wherein the first key being derived based on the second key comprises the first key being derived based on the second key, a key derivation parameter, and the cell identifier of the cell belonging to the second base station;
wherein the key derivation parameter comprises a next hop chaining count.

8. The system according to claim 7, wherein the second base station is configured to transmit the cell identifier to the first base station.

9. The system according to claim 7, wherein the second base station is further configured to receive a RRC connection resume request from the terminal.

10. The system according to claim 9, wherein the RRC connection resume request comprises an identifier and identity authentication information of the terminal.

* * * * *